(12) United States Patent
Takayama

(10) Patent No.: US 6,493,166 B1
(45) Date of Patent: Dec. 10, 2002

(54) TAPE CASSETTE AND TAPE RECORDING AND/OR REPRODUCING APPARATUS

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/200,032

(22) Filed: Nov. 25, 1998

(30) Foreign Application Priority Data

Nov. 28, 1997 (JP) .............................................. 9-328366

(51) Int. Cl.⁷ .............................................. G11B 15/18
(52) U.S. Cl. ...................................................... 360/69
(58) Field of Search ............................ 360/60, 69, 48, 360/132, 72.2; 711/111, 112

(56) References Cited

U.S. PATENT DOCUMENTS

| | | | | |
|---|---|---|---|---|
| 4,723,181 A | * | 2/1988 | Hickok | 360/72.2 |
| 5,493,455 A | * | 2/1996 | Miyoshi et al. | 360/60 |
| 5,852,534 A | * | 12/1998 | Ozue et al. | 360/69 |
| 6,101,070 A | * | 8/2000 | Oguro | 260/132 |

FOREIGN PATENT DOCUMENTS

| | | | |
|---|---|---|---|
| EP | 637025 | 7/1994 | |
| GB | 2334615 | 8/1999 | |
| WO | WO97/02566 | * 1/1997 | ........... G11B/27/00 |

* cited by examiner

Primary Examiner—David Hudspeth
Assistant Examiner—K. Wong
(74) Attorney, Agent, or Firm—Jay H. Maioli

(57) ABSTRACT

A tape streamer device in which the current arraying state of partitions formed on a tape-shaped recording medium can be known even on addition or deletion of partitions. Includes a recording and/or reproducing unit 130 and a write/readout controller 163. The recording and/or reproducing unit 130 has a partition rewriting portion for rewriting the partitions and a data recording and/or reproducing portion for the partitions. The recording and/or reproducing unit 130 has the function of controlling the recording and/or reproducing portion based on the arraying information stored in a memory-in-cassette unit for recording and/or reproducing data. The write/readout controller 163 has the partition arraying information writing function of storing the arraying information indicating the arraying of the partitions in the magnetic tape 12 in the memory-in-cassette unit.

2 Claims, 20 Drawing Sheets

FIG.9A MAGNETIC TAPE

FIG.9B PARTITION

| | | |
|---|---|---|
| Raw Format ID | | 16bit |
| Logical Format ID | | 8bit |
| Logical Format ID | Last Frame ID | 1bit |
| | ECC Frame ID | 1bit |
| | Logical Frame Number | 6bit |
| Partition ID | | 16bit |
| Area ID | | 4bit |
| Data ID | | 4bit |
| N-Position | | 4bit |
| N-Repeats | | 4bit |
| Group Count | | 24bit |
| File-mark Count | | 32bit |
| Save-Set Mark Count | | 32bit |
| Record Count | | 32bit |
| Absolute Frame Count | | 24bit |
| Reserved | | |

FIG.16

| bit 3210 | Definition |
|---|---|
| 0000(0) | Device Area |
| 0001(1) | Reference Area |
| 0010(2) | System Area |
| 0011(3) | Reserved |
| 0100(4) | Data Area |
| 0101(5) | EOD Area |
| 0110(6) | Reserved |
| 0111(7) | Option Device Area |

FIG.17

TAPE CASSETTE AND TAPE RECORDING AND/OR REPRODUCING APPARATUS

BACKGROUND OF THE INVENTION

1. Field of the Invention

This invention relates to a tape cassette comprised of a tape-shaped recording medium housed in a cassette, and to a recording and/or reproducing apparatus for recording and/or reproducing data for the tape-shaped recording medium.

2. Description of the Related Art

As a tape recording and/or reproducing apparatus, capable of recording and/or reproducing digital data for a tape-shaped recording medium, there is known a so-called tape streamer drive. This tape streamer drive can have a voluminous recording density of the order of, for example, tens to hundreds of gigabyte, depending on the tape length of the tape cassette, as a recording medium, and is widely used for backing the data recorded on a hard disc, for example, of a main body unit of the computer. It is also conveniently used for storage of picture data of large data size.

As the above-mentioned tape streamer drive, there is proposed such a one configured for recording and/or reproducing data for a tape cassette for an 8 mm VTR as a recording medium, in accordance with a helical scan system employing a rotary head.

As the above-mentioned tape streamer drive, exploiting such a tape cassette for an 8 mm VTR, the small computer system interface (SCSI), for example, is used as an input/output interface of recording and/or reproducing data.

During recording, data furnished from, for example, a host computer, is inputted via the SCSI interface. This input data is transmitted in terms of preset groups of data of a fixed length as a unit. The input data is compressed, if need be, in accordance with a preset system, and transiently stored in a buffer memory. The data stored in the buffer memory is supplied to a recording and/or reproducing system in terms of a preset length, known as a groove, as a unit, so as to be recorded by a rotary head on a magnetic tape.

During reproduction, data of a magnetic tape is read out by a rotary head so as to be transiently stored in the buffer memory. The data from the buffer memory is expanded., if previously compressed for recording, and is transmitted via SCSI interface to a host computer.

The data recording area on the magnetic tape forms numbered partitions in which it is possible to reproduce or record data.

In a data storage system, comprised of the above-described tape streamer drive and a tape cassette, the numbers affixed to the partitions are used to supervise the partitions on the magnetic tape for performing proper recording and/or reproducing operations for the magnetic tape of the tape cassette. For example, for performing recording and/or reproduction, the tape streamer device moves to the partition carrying the desired number, by prediction from the current prevailing partition number.

For recording the recording data on a data recording area carrying plural partitions on the magnetic tape as described above, the numbers affixed to these partitions are in the falling order beginning from the leading end of tape (BOT) to the trailing end of tea (EOT) of the tape-shaped recording medium, as shown in FIG. 1. If, for example, there are formed eight partitions, the partition numbers are $P_7$, $P_6$, $P_5$, $P_4$, $P_3$, $P_2$, $P_1$, $P_0$ from the BOT of the tape-shaped recording medium. The suffixes of the partition numbers, that is n of $P_n$, stand for the partition numbers.

The reason the partition numbers are in the falling order is to enable the total number of the partitions formed on the tape-shaped recording medium to be inferred from the partition number of the leading end of the tape-shaped recording medium. For example, from the partition number affixed to the leading end partition, herein "7", it can be inferred that a sum total of 8 partitions are formed on the tape-shaped recording medium shown in FIG. 1.

There are occasions wherein, if the partitions are formed in this manner in succession, the operator desires to add a new partition. In such case, a new partition can be added by splitting a pre-existing partition.

The routine practice in adding a partition is to split the partition $P_0$ of the EOT of the tape-shaped recording medium. This adds the new partition $P_8$ at back of the partition $P_0$, with the number affixed to the partition $P_8$ being "8". However, this produces disruption in the partition numbers affixed to the partitions.

If, when the partition $P_8$ is added to the trailing end of the partition $P_0$, and the current prevailing position is the partition $P_3$, the operator desires to move to the partition $P_8$, the operator moves to the BOT of the tape-shaped recording medium, reliance being had on the relation 3<8, on the assumption that the numbers affixed to the partitions are on the falling order.

If the tape streamer device is moved based on this assumption, it is not possible to find out the partition $P_8$ provided at the trailing end where the new partition has been added. That is, for efficient movement of the tape streamer device to the targeted partition $P_8$, there is required means for grasping the current disposition of the partitions without regard to the current positions.

There occurs a similar situation in case of partition deletion. For example, if the operator moves in search of the partition $P_0$ unawares of the fact that the partition $P_0$ has been deleted, there is no such partition and the tape comes to a close contrary to the intention of the operator. In order to avoid this from occurring, means need to be provided which permits the fact of previous deletion of the partition without regard to the current partition position.

SUMMARY OF THE INVENTION

It is therefore an object of the present invention to provide a tape cassette and a tape recording and/or reproducing apparatus in which the current arraying states of the partitions formed on the tape-shaped recording medium can be grasped even if partitions are deleted or added incidentally.

A tape cassette according to the present invention includes a tape-shaped recording medium having at least two numbered partitions in each of which recording data is recorded, and storage means for storing the ancillary information concerning each of the partitions. The storage means is provided separately from the tape-shaped recording medium, and holds on memory the arraying information specifying the arraying state of the partitions on the tape-shaped recording medium.

The tape cassette can thus store the arraying information indicating the partitions in the tape-shaped recording medium.

A tape recording and/or reproducing apparatus according to the present invention includes partition rewriting means for rewriting partitions on the tape-shaped recording medium, partition rewriting means for rewriting the partitions on the tape-shaped recording medium, writing means for storing the arraying information specifying the arraying of the partitions in the storage means, recording and/or reproducing means for recording and/or reproducing the recording data for the partitions, and controlling means for controlling the recording and/or reproducing means based on the arraying information to record and/or reproduce data.

Thus, the tape recording and/or reproducing apparatus controls the recording and/or reproducing means by the controlling means based on the arraying information of the partitioned tape cassette in the tape-shaped recording medium written by the partition arraying information writing means in the tape cassette storage means.

BRIEF DESCRIPTION OF THE DRAWINGS

FIG. 16 shows the ID area information on the magnetic tape.

FIG. 17 illustrates the definition of the area ID contained in the ID area information.

DESCRIPTION OF THE PREFERRED EMBODIMENTS

Figure 1:
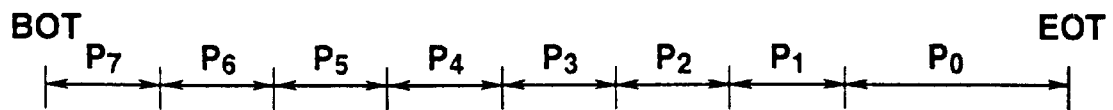
FIG. 1 shows the state in which plural partitions are formed on the magnetic tape for illustrating that the partition numbers are affixed in the falling order from the BOT to the EOT of the magnetic tape.

Referring to the drawings, preferred embodiments of the present invention will be explained in detail. The present embodiment is directed to a tape cassette provided with a non-volatile memory and with a tape streamer device provided in association with this tape cassette for enabling recording and/or reproduction of digital data. The non-volatile memory provided on the tape cassette is hereinafter termed a memory-in-cassette (MIC).

Figure 8:
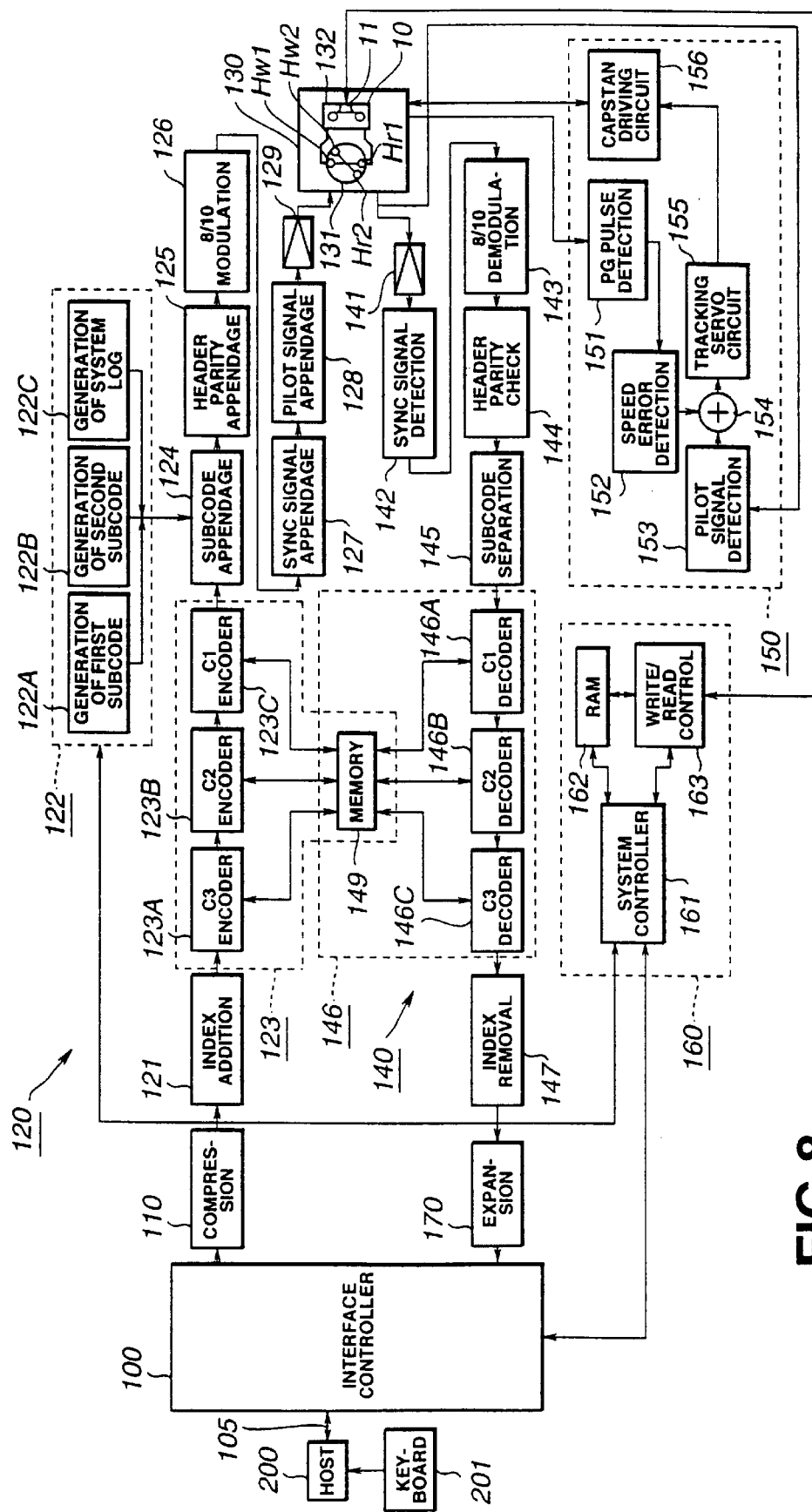
FIG. 8 is a block circuit diagram showing the structure of a tape streamer device embodying the present invention.

FIGS. 4 to 7 illustrate a tape cassette 10 and FIG. 8 shows a circuit structure of a tape streamer device 1.

The tape cassette 10 includes a magnetic tape 12 (FIG. 7) having at least two numbered partitions each having recording data recorded thereon, and an MIC 11 (FIG. 5) as storage means for storing the ancillary information concerning each of the partitions.

The tape cassette 10 stores, in its MIC 11, the arraying information showing the arraying of the partitions in the magnetic tape 12.

Referring to FIG. 8, the tape streamer device I includes a recording/reproducing unit 130 and a write/readout controller 163 having the partition arraying information writing function of storing the arraying information indicating the arraying of the partitions on the magnetic tape 12 in the MIC 11. The recording/reproducing unit 130 includes partition rewriting means and recording and/or reproducing means for recording and/or reproducing data for the partitions and has the function of controlling the recording and/or reproducing means based on the arraying information stored in the MIC 11 for recording and/or reproducing data.

First, the tracking control 10 constituted in association with the tape streamer device 1 is explained.

Specifically, the an upper cartridge half 13 and a lower cartridge half 14, each formed as a substantially rectangular shallow saucer from a synthetic resin material, are combined and fastened together so that respective opening sides face each other using plural set screws to complete a substantially box-shaped main cartridge body unit 15. In the main cartridge body unit 15 are rotatably housed a tape supply reel 16 and a tape takeup reel 17 which are arranged side-by-side lengthwise of the main cartridge body unit 15 and around which is wrapped a magnetic tape 12 as a tape-shaped recording medium.

Figure 5:
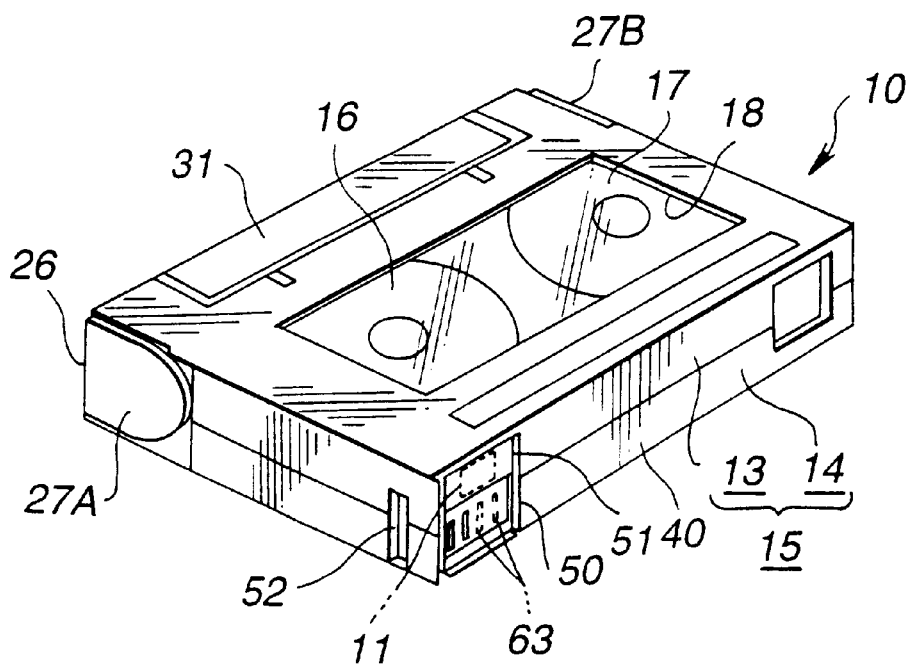
FIG. 5 is a perspective view showing the structure of the upper surface side and the back surface side of the tape cassette shown in FIG. 4.

Referring to FIG. 5, a rectangular display window 18 is formed in the top surface of the upper cartridge half 13 of the main cartridge body unit 15, constituting the upper surface of the tape cassette, in order to permit visual inspection from outside of the status of the magnetic tape 12 wrapped around the tape supply reel 16 and the tape takeup reel 17 housed in the inside of the main cartridge body unit 15.

Figure 6:
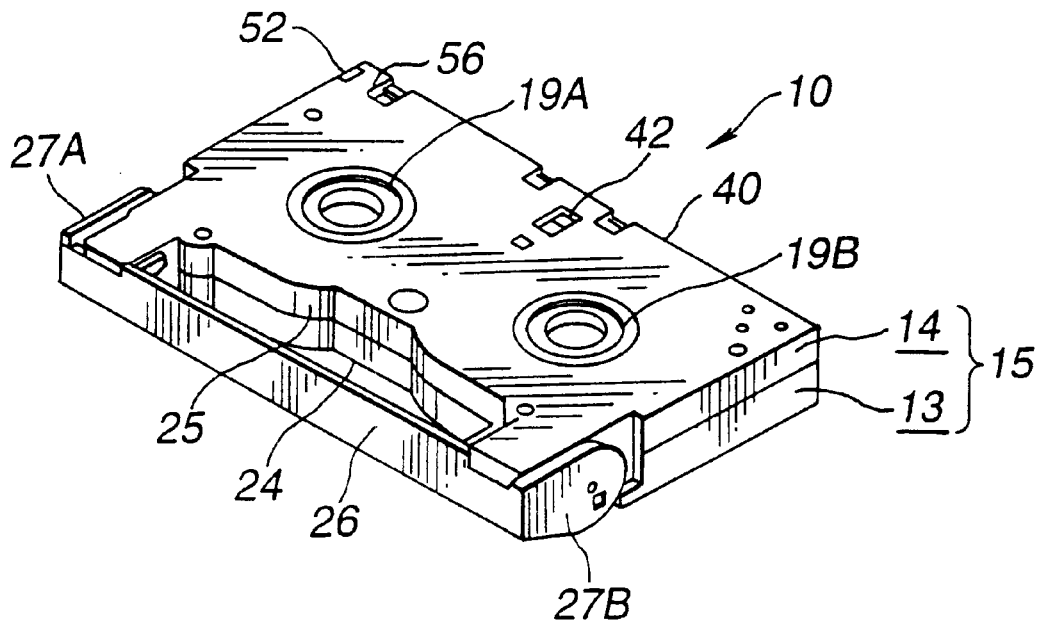
FIG. 6 is a perspective view showing the structure of the bottom surface side and the front surface side of the tape cassette shown in FIG. 4.
Figure 7:
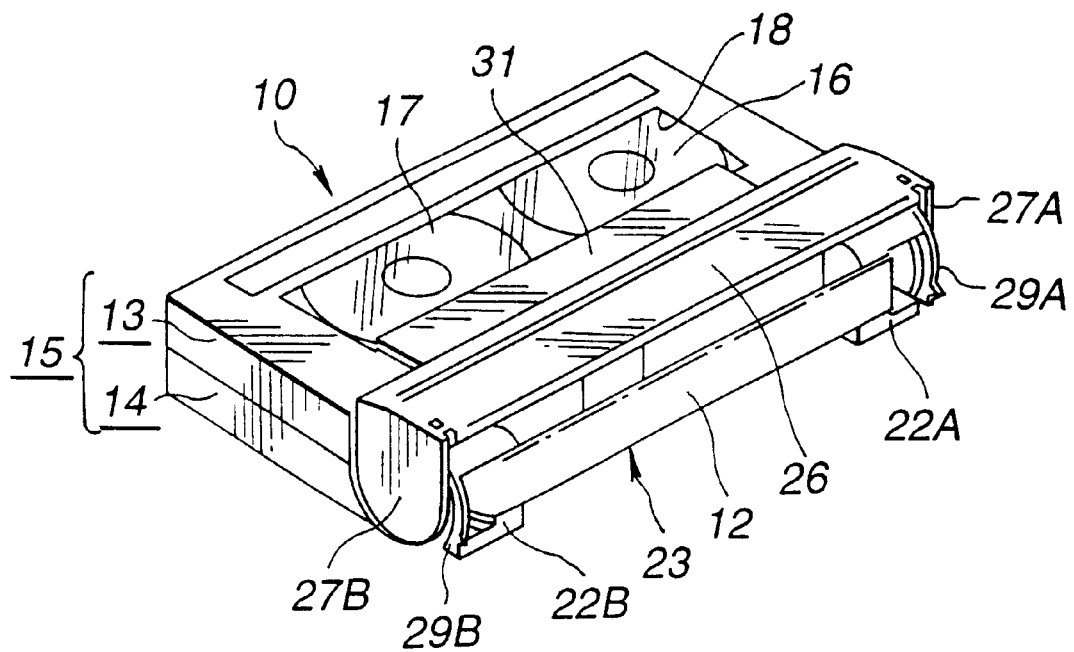
FIG. 7 is a perspective view showing the state in which a lid of the tape cassette shown in FIG. 4 is closed.

Referring to FIG. 6, the lower cartridge half 14 of the main cartridge body unit 15 providing the bottom surface of the tape cassette is provided with hub fitting holes 19A, 19B adapted for permitting the hubs of the tape supply reel 16 and the tape takeup reel 17 to be partially exposed to outside and for controlling the rotation of the reels 16, 17. The bottom surface of the lower cartridge half 14 is provided with various discriminating holes, such as a tape length detection opening for detecting the length of the magnetic tape 12 or a tape design parameter discrimination opening for discriminating the type of the magnetic tape 12.

The tape supply reel 16 and the tape takeup reel 17 are each provided with a cylindrical hub around which is wound the magnetic tape 12 and a discoid flange provided on one side of the hub. The tape supply reel 16 and the tape takeup reel 17 are rotatably housed in the main cartridge body unit 15 by having the hubs fitted in the hub fitting holes 19A, 19B. Also, the tape supply reel 16 and the tape takeup reel 17 are prevented from wobbling in the main cartridge body unit 15 by having the center of rotation of the hubs thereof biased towards the lower cartridge half 14 by a reel presser spring and a reel presser plate, not shown.

The magnetic tape 12 has its both ends secured by a clamper, not shown, to the hubs of the tape supply reel 16 and the tape takeup reel 17. The magnetic tape 12 is pulled out from the tape supply reel 16 and guided by tape guides 22A, 22B formed as-one with the lower cartridge half 14 to travel along a front side 23 of the main cartridge body unit 15 so as to be taken up by the tape takeup reel 17.

The main cartridge body unit 15 has its front side 23 opened along substantially the entire width and is formed with a tape extracting portion 24, in continuation to the front surface 23, as a spacing into which is intruded loading means of the recording/reproducing unit 130. The inner spacing of the main cartridge body unit 15 in which are rotatably housed the tape supply reel 16 and the tape takeup reel 17 is delimited from the tape extracting portion 24 by a partition 25.

On the main cartridge body unit 15 is rotatably mounted a lid member 26 adapted for closing the opened front side 23. The lid member 26 is of a length approximately equal to the width of the main cartridge body unit 15, and is formed on its ends as-one with sidewall sections 27A, 27B providing pivots, so that the lid member 26 in its entirety is formed in a U-shape. On the inner surfaces of the sidewall sections 27A, 27B are formed pin shafts having axes coincident with each other.

Figure 4:
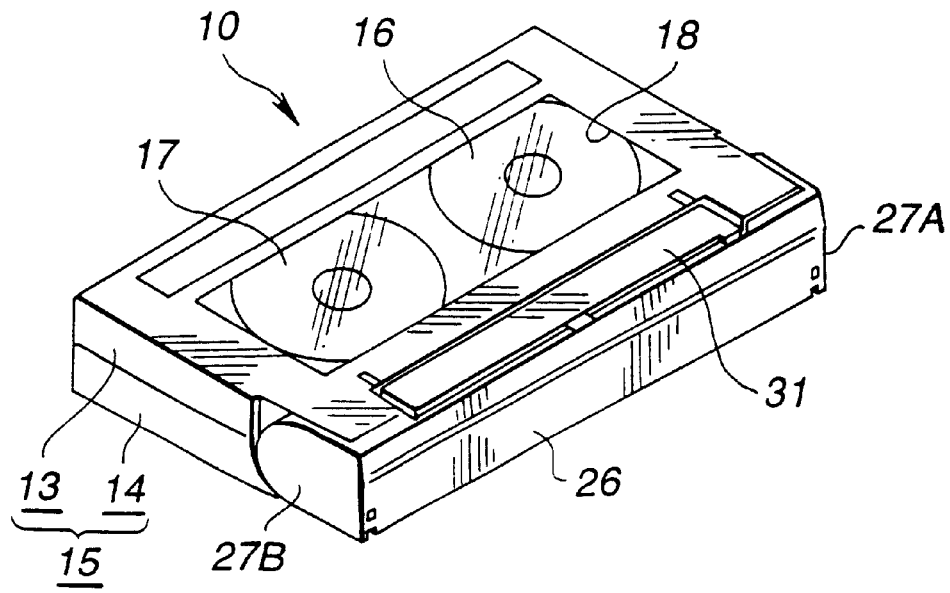
FIG. 4 is a perspective view showing the structure of the upper surface side and the front surface side of a tape cassette embodying the present invention.

The main cartridge body unit 15 has pivots 29A, 29B by both lateral wall sections of the lower cartridge half 14 protruding for surrounding the opened front side 23. These pivots 29A, 29B are formed with shaft holes in register with pin shafts of the lid member 26. Thus, the lid member 26 is rotatably combined with the front side 23 of the main cartridge body unit 15 by having the pin shafts engaged in the shaft holes. The lid member 26 usually closes the opened front side 23 (FIG. 7) of the main cartridge body unit 15, as shown in FIG. 4.

On the lid member 26 are assembled an upper lid member 31 closing the opened front side of the upper cartridge half 13, and a spring member, not shown. The upper lid member 31 is rotatably assembled on the inner surface of the lid member 26 and, in a state in which the lid member 26 is rotated to open the front side 23 of the main cartridge body unit 15, as shown in FIG. 6, the upper lid member 31 is moved along the upper surface of the upper cartridge half 13, while the upper lid member 31 is rotated as it is supported by the lid member 26. The spring member, not shown, biases the lid member 26 into rotation in a direction of closing the front surface 23, in a manner not shown.

On the lid member 26 is rotatably assembled an inner lid member, not shown, for facing the inner major surface of the lid member 26. This inner lid member is supported for facing the inner major surface of the lid member 26 with a predetermined spacing in which runs the magnetic tape 12 positioned on the front side 23 of the main cartridge body unit 15. Thus, the magnetic tape 12 is usually covered by the lid member 26 and the inner lid member and is thereby protected against deposition of dust or dirt or the external force. The inner lid member is rotated in unison with the above-mentioned rotation of the lid member 26 to expose the magnetic tape 12 to the front side 23 of the main cartridge body unit 15.

The magnetic tape 12 has at least two numbered partitions in each of which the recording data is recorded. The numbers affixed to the partitions are in the rising order from the leading end of the tape-shaped recording medium (BOT) to its trailing end (EOT). That is, the number of the partition beginning from the leading end of the magnetic tape 12 is $P_7$, as shown in FIG. 1, such that partitions bearing the numbers $P_6$, $P_5$, $P_4$, $P_3$, $P_2$, $P_1$ and $P_0$ in this sequence are formed towards the trailing end of the magnetic tape 12.

On the tape cassette 10 is loaded an auxiliary storage device, as shown in FIG. 5. This auxiliary storage device is made up at least of a circuit board, the above-mentioned MIC 11, as a non-volatile memory mounted on this circuit board, and plural contact terminals 63 formed on the circuit board for operating as its input/output terminals.

The MIC 11 has a storage element and an input/output controller adapted for controlling data input/output during recording between the contact terminals 63 and a write/readout controller 163 of the tape streamer device 1 connected to the MIC 11 via a connector as later explained.

If the number of contacts of the contact terminals 63 is lesser than the sum of the number of the data and address lines of the storage element and the number of wires used for power supply, data inputting/outputting between the MIC 11 and a write/readout controller 163 is by serial communication. In this case, a communication controller is provided in each of the input/output controller and the write/readout controller 163.

If the data inputting/outputting between the MIC 11 and the write/readout controller 163 is by serial communication, as described above, the number of the contact terminals 63 can be decreased to reduce the area of the contact terminals 63. This can make the size of a terminal opening 51 formed in the tape cassette 10 smaller to facilitate the designing of the other component members of the tape cassette.

If, for example, the number of contacts of the contact terminals 63 is not less than the sum of the data and address lines of the storage element and the number of wires used for power supply, it is possible for the write/readout controller 163 to directly control writing and readout for the storage element of the MIC 11. In this case, the input/output controller can be constructed more simply, while it is possible to expedite writing/readout for the storage element.

On the auxiliary storage device is recorded the identification information for discriminating the contents of data recorded on the magnetic tape 12, magnetic tape specifications or the tape using states.

The circuit board is designed as a so-called double-sided circuit board on one major surface of which disposed inwardly in the assembled state of the circuit board on the main cartridge body unit 15 is mounted the MIC and on the other major surface of which disposed outwardly in the above-mentioned assembled state is formed a contact terminal 63 by printing.

Referring to FIG. 5, the auxiliary storage device is arranged so that the contact terminals 63 are exposed to outside via the terminal opening 5 provided in an upstanding peripheral wall section 40 at a corner on the back surface of the main cartridge body unit 15. This terminal opening 51 is formed n the upstanding peripheral wall section 40 as a rectangular opening sized sufficiently to permit the contact terminals 63 of the auxiliary storage device to be exposed to outside. This auxiliary storage device is assembled on the main cartridge body unit 15 by having both side edges of the circuit board fitted in insertion grooves so that both side edges of the circuit board are fitted in mating insertion grooves. Between the contact terminals 63 and the terminal opening 51 is arranged a shutter member 50 designed as a rectangular member sized sufficiently to close the terminal opening 51. The shutter member 50 is usually biased towards the bottom side of the lower cartridge half 14 under the bias of a tension coil spring, not shown, to close the terminal opening 51.

The tape streamer device 1, constituting a data recording device according to the present invention, is explained with reference to FIG. 8.

The tape streamer device 1, shown in FIG. 8, includes an interfacing controller 100 for having data exchange with outside, recording data processing system 120 for processing data inputted via this interfacing controller 100 for converting the format to a predetermined format, and a recording/reproducing unit 130 for recording signals supplied from this recording data processing system 120 on the magnetic tape 12 and for reproducing the magnetic tape 12. This tape streamer device 1 also includes a playback data processing system 140 for processing the playback output from the recording/reproducing unit 130 to reproduce data recorded on the magnetic tape 12, a motor driving servo circuit 150 for controlling the tape running system of the recording/reproducing unit 130 and a recording data supervising unit 160 for supervising data recorded on the magnetic tape 12.

In this tape streamer device 1, the interfacing controller 100 is comprised of a so-called small computer system interface (SCSI) adapted for sending data supplied from information processing apparatus, such as external personal computers or work stations, to the recording data processing system 120, and for sending the recording data reproduced by the playback data processing system 140 to the information processing apparatus.

This tape streamer device 1 is sequentially fed during data recording with data from a host computer 200 via SCSI interface 100 in terms of a record of a fixed length, as later explained, as a transmission data unit. This data is sent to a compression circuit 110. This tape streamer device 1 also has a mode of transmitting data from the host computer 200 in terms of a set of data of variable length as a data transmitting unit. This, however, is not explained herein specifically. To the host computer 200 is also connected a keyboard 201.

The compression circuit 110 compresses input data in accordance with a preset system, if need be. If the compression system by, for example, the LZ code, is adopted as an illustrative compression system, dedicated codes are allocated to letter or character strings processed in the past for storage as a dictionary. The letter or character stings, subsequently entered, are compared to the dictionary contents. If the strings of the input data are coincident with the dictionary codes, the letter or character stings are substituted for the dictionary codes. On the other hand, new codes are sequentially accorded to data of the input letter or character stings not coincident with the dictionary so that the data and the new codes allocated thereto are registered in the dictionary. In this manner, the data of the input letter or character stings are registered in the dictionary and the letter or character sting data are replaced by the dictionary codes by way of data compression.

The recording data processing system 120 includes an index appendage unit 121 for appending the index information to recording data sent from the interfacing controller 100, a subcode generator 122 for generating subcodes, an error correction code generator 123 for appending error correction codes to the recording data from the index appendage unit 121 and a subcode appendage unit 124 for appending block addresses and subcodes from the subcode generator 122 to the recording data corrected for errors.

The subcode generator 122 includes first and second subcode generators 122A, 122B, and a system log generator 122C. The error correction code generator 123 includes a memory 149, a C3 encoder 123A, a C2 encoder 123B and a C1 encoder 123C.

The recording data processing system 120 includes a header parity appendage circuit 125 for appending header parity to the recording data from the subcode appendage unit 124, an eight-to-ten modulator 126 for eight-to-ten modulating the recording data sent from the header parity appendage circuit 125 and a synchronization signal appendage unit 127 for appending synchronization signals to the recording data sent from the eight-to-ten modulator 126. The recording data processing system 120 also includes a pilot signal appendage unit 128 for appending pilot signals for automatic track finding (ATF) for tracking control to the recording data sent from the synchronization signal appendage unit 127 and an amplifier 129 for amplifying recording data sent from the pilot signal appendage unit 128.

The recording/reproducing unit 130 includes a rotary drum 131 for rotating two recording magnetic heads Hw1, Hw2 having respective different azimuth angles and two playback magnetic heads Hr1, Hr2 similarly having respective different azimuth angles. These two pairs of the magnetic heads HW1, Hw2, Hr1, Hr2 are mounted adjacent to one another in the circumferential direction of the rotary drum 131 so as to have a separation corresponding to a track pitch Tp along the axis of the rotary drum 131, that is along the track width.

The playback data processing system 140 includes an amplifier 141 for amplifying the playback output of the inclined track of the magnetic tape 12 sent from the recording/reproducing unit 130, and a synchronization signal detection unit 142 for detecting synchronization signals from the playback output sent from the amplifier 141, converting the playback output to binary signals, correcting the signals for jitter and for outputting the corrected signals. The playback data processing system 140 also includes an eight-to-ten demodulator 143 for eight-to-ten demodulating the converted binary playback data and a header parity check unit 144 for checking the header parity of the playback data from the eight-to-ten demodulator 143.

The playback data processing system 140 also includes a subcode separating unit 145 for separating subcodes from the playback data from the header parity check unit 144, an error correction unit 146for correcting the playback data freed of the subcode from the subcode separating unit 145 and an index separating unit 147 for separating the index from the playback data corrected for errors by the error correction unit 146. The error correction unit 146 is made up of a memory 149, a C1 decoder 146A, a C2 decoder 146B and a C3 decoder 146C.

The motor driving servo circuit 150 includes a PG detection unit 151, fed from the recording/reproducing unit 130 with PG pulses corresponding to rotation of the rotary drum 131, and a speed error detection unit 152 for detecting speed errors from a detection output of the PG detection unit 151. The motor driving servo circuit 150 also includes a pilot signal detection unit 153 for detecting the pilot signals for ATF from the playback output of the recording/reproducing unit 130, and an adder 154 for adding the detection outputs of the speed error detection unit 152 and the pilot signal detection unit 153. The motor driving servo circuit 150 finally includes a tracking servo circuit 155 for generating tracking servo signals based on the addition output of the adder and a capstan driving circuit 156 for controlling the tape running system of the recording/reproducing unit 130 based on the tracking servo signals.

The motor driving servo circuit 150 also includes driving actuating means for rotationally driving a reel rotatably mounted in the tape cassette.

The motor driving servo circuit 150 can control driving control means to fast feed the magnetic tape 12 to a preset position. For example, the motor driving servo circuit 150 can cause movement of the magnetic tape to an optional device area by fast feed as later explained.

The motor driving servo circuit 150 has its operation controlled by a system controller 161.

The recording data supervising unit 160 includes a system controller 161 for supervising data recorded on the magnetic tape 12, a RAM 162 for holding the above-mentioned identification information and a write/readout controller 163 for controlling the writing and readout for the RAM 162 via the recording/reproducing unit 130.

The system controller 161 writes the system log for supervising the partitions provided on the magnetic tape 12, or the files recorded on the magnetic tape 12 on the RAM 162, as the identification information. The write/readout controller 163 reads out the system log recorded on the RAM 162 to send the read-out system log stored in the RAM 162 to send the read-out system log via recording/reproducing unit 130 to the MIC 11, while writing the system log read out from the MIC 11 in the RAM 162.

Based on a decision given by the system controller 161, the expansion circuit 170 expands data compressed by the compression circuit 110. The expansion circuit 170 allows non-compressed data to be directly outputted without performing data expansion.

Output data of the expansion circuit 170 are outputted via SCSI interface 100 to the host computer 200 as playback data.

There is shown in FIG. 8 the MIC 11 provided on the tape cassette 10. If a main body unit of the tape cassette is loaded on the tape streamer device 1, the MIC 11 is connected to the system controller 161 via a terminal pin etc to permit data input/output with the system controller 161.

The information is transmitted between the MIC 11 and the host computer 200 using SCSI commands. Thus, there is no particular necessity for providing a dedicated line between the MIC 11 and the host computer 200, so that data exchange between the tape cassette and the host computer 200 can be effected solely by the SCSI interface 100.

The operation of the above-described tape streamer device 1 is hereinafter explained.

For recording, recording data is sent to the tape streamer device 1 via interfacing controller 100 from an information processing apparatus, such as personal computer or workstation. When fed over bus 105 with the recording data, the interfacing controller 100 sends the recording data to the index appendage unit 121 and to the subcode generator 122.

If fed with recording data from the interfacing controller 100, the index appendage unit 121 appends to the recording data the index information for discriminating a series of the recording data, in terms of a group of data of the above-mentioned 40 tracks or 20 frames as a unit, and sends the resulting data to the error correction code generator 123.

The error correction code generator 123 transiently stores the recording data sent from the index appendage unit 121 in the memory 149 on the data unit basis. The C3 encoder 123A generates an error correction code C3 of a data string along the track width for each group of the recording data stored n the memory 149 and allocates the error correction code C3 to the last two tracks of the above 40-track group. The C2 encoder 123B generates an error correction code C2 of a data string along the track direction and halves the error correction code C2 to allocated the halves to both terminal portions of the main data area of each track. The C1 encoder 123C generates the block-based error correction code C1 as later explained.

Based on the recording data inputted via the interfacing controller 100, the first subcode generator 122A of the subcode generator 122 generates separator counts as the demarcation information indicating the demarcation of the recording data and record counts indicating the number of records. The second subcode generator 122B generates, along with the block addresses, an area ID specifying each area, as defined on the tape format a frame number, a group count specifying the number of recording units, the check sum etc. The system log generator 122C also generates the partition-based system log (hysteresis information) prescribed as the above-mentioned tape format.

The subcode appendage unit 124 also appends the block addresses and the subcodes sent from the subcode generator 122 to the recording data to which have been appended the error correction codes C3, C2 and C1 by the error correction code generator 123. This allocates the subcode and the block addresses to the sub-area of each block. The subcode appendage unit 124 also allocates area ID, block addresses etc, generated in the second subcode generator 122B as described above, to two sub-areas (sub-1, sub-2) of each block. The subcode appendage unit 124 also constitutes sub-data from the count value generated by the first subcode generator 122A as well as an area ID, a group count and a check sum etc generated by the second subcode generator 122B to allocate the resulting sub-data to the above-mentioned sub-areas.

The header parity appendage circuit 125 generates 2-byte parity for error detection for the sub-code and the block address appended the recording data by the subcode appendage unit 124 to append the 2-byte parity to the recording data. This allocates the 2-byte parity to the sub-area of each block.

The eight-to-ten modulator 126 converts the recording data of each block, to which the header parity and the block address have been appended by the header parity appendage circuit 125, from 8-bit data to 10-bit data, on the byte basis.

The synchronization signal appendage unit 127 appends synchronization signals to the recording data converted into 10-bit data by the eight-to-ten modulator 126, from one block to another. This allocates the synchronization signals to a first area of each block described above. The so-formed recording data is sent to the pilot signal appendage unit 128.

The pilot signal appendage unit 128 generates pilot signals for ATF and appends these pilot signals for ATF to the recording data to send the resulting signals via amplifier 129 to the magnetic heads Hw1, Hw2. This causes the magnetic heads Hw1, Hw2 to scan the magnetic tape 12 to effect recording to form a recording track thereon in accordance with a predetermined format.

It is also possible to produce partitions on the magnetic tape 12 prior to recording as described above. In this case, the system controller 16 first formulates the partitions on the magnetic tape 12 and subsequently formulates the management information for the partitions indicating the number of the partitions, starting positions of the partitions etc to write the resulting information on the RAM 162. An illustrative example of formulation of the partitions will be explained in detail subsequently.

If the directory in the partition is formulated, deleted or modified, or if files in the directory are recorded, deleted or modified, the identification information of each file is read out from the RAM 162 and modified in accordance with the above recording etc. The modified identification information is then written in the RAM 162. For recording, deleting or modifying the files, the system controller 161 reads out the management information for supervising the recording position of each file from the RAM 162 and modifies the read-out management information in accordance with the new file recording position to write the resulting information on the RAM 162.

If the management information of each partition, the identification information of each file or the management information for supervising the recording position of each file, stored in the RAM 162, is updated, the write/readout controller 163 writes the updated management information in the MIC 11 via connector 132 and contact terminals 63 of the recording/reproducing unit 130.

In this manner, data are recorded on the file basis on the magnetic tape 12, while the identification information etc of each file recorded on the magnetic tape 12 is recorded on the MIC 11.

If data are recorded across plural tape cassettes, the system controller 161 generates the information concerning the totality of tape cassettes 10 carrying recorded data, the identification information for discriminating the tape cassettes 10 carrying recorded data and the identification information for discriminating data recorded on each tape cassette 10. The write/readout controller 163 then stores the identification information thus generated in the RAM 162.

If, in reproducing the recorded magnetic tape 12, the tape cassette 10 is loaded on the recording/reproducing unit 130 of the tape streamer device 1, the contact terminals 63 is exposed via the terminal opening 51 and connected via the connector 132 to the write/readout controller 163.

The write/readout controller 163 reads out the management information for supervising the above-mentioned management information, identification information of each file and the management information for supervising the recording position of each file to write the read-out information on the RAM 162.

If the reproduction of the magnetic tape 12 is instructed by the system controller 161 to reproduce the magnetic tape 12, the recording/reproducing unit 130 controls the rotation of the rotary drum 131 so that the rpm of the rotary drum 131 will be equal to that for recording. The recording/reproducing unit 130 also controls the running of the magnetic tape 12 so that the magnetic tape 12 will run at a preset speed. Thus, the playback magnetic heads Hr1, Hr2 scan the magnetic tape 12 with a tilt to send the playback output resulting from the scanning of the magnetic tape via amplifier 141 to the synchronization signal detection unit 142. The synchronization signal detection unit 142 detects the synchronization signal from the playback output sent thereto to convert the playback output into binary data by clocks synchronised with the synchronization signals to generate playback data which are sent to the eight-to-ten demodulator 143.

The eight-to-ten demodulator 143 converts the reproduced data from the synchronization signal detection unit 142 from 10-bit data to 8-bit data which are sent to the header parity check unit 144. Using the above-mentioned two-byte header parity, the header parity check unit 144 performs parity check of the subcode and the block address. The subcode separating unit 145 separates the parity-checked correct sub-code from the reproduced data, by the header parity check unit 144, to send the resulting data to a system controller etc, not shown, to send the playback data freed of the subcode to a memory 149.

The memory 149 temporarily stores the playback data, having the index information appended thereto, with the 40-track or 20-frame playback data as a unit. Based on the unit-based playback data, stored in the memory 149, the C1 decoder 146A corrects the playback data of each block for errors, using the error correction code C1 appended to each block, as will be explained subsequently.

The C2 decoder 146B performs error correction on a data string in the track direction of the unit-based playback data, corrected for errors by the C1 decoder 146A, using the error correction code C2 appended to each terminal portion of the playback data area of each track, as later explained. The C3 decoder 146C performs error correction on a data string in the track width direction of the unit-based playback data corrected for errors by the C2 decoder 146B.

With the present tape streamer device 1, in which the playback data is corrected for errors using the error correction codes C1, C2 and C3, the playback data can be reliably corrected for errors, thus improving reliability of the playback data.

The index separating unit 147 separates the index information from the unit-based payback data, corrected for errors by the error correction unit 146 as described above, to send the index information to the system controller 161 etc, while sending the playback data to the interfacing controller 100.

The interfacing controller 100 transmits the playback data from the index separating unit 147 over bus 105 to the host computer 200, such as the personal computer or the work station.

Figure 9:
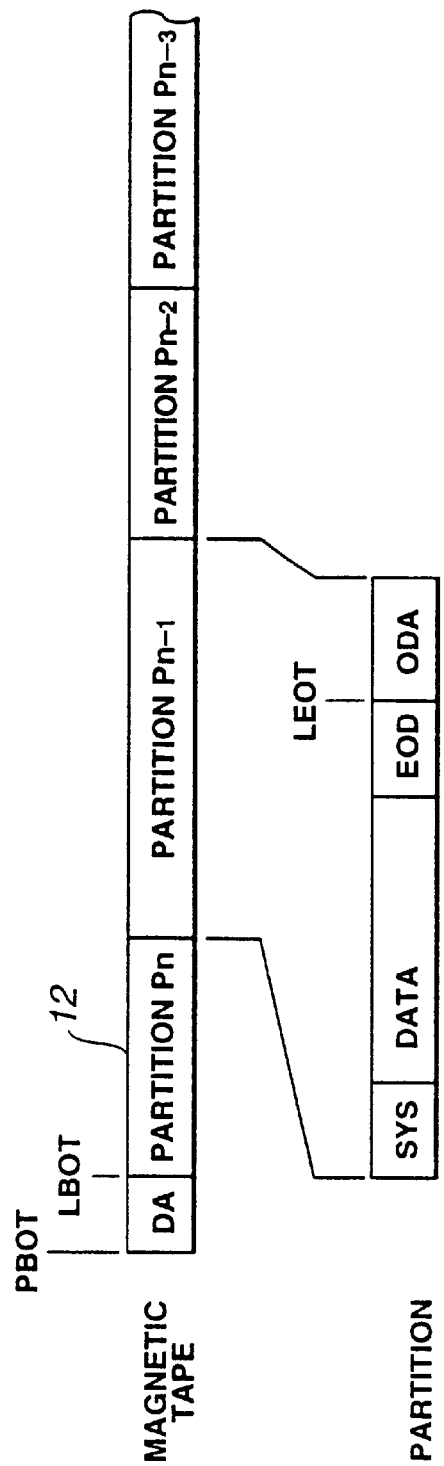
FIG. 9 shows the data structure of a magnetic tape on which data is written or read out by the tape streamer device shown in FIG. 8.

FIG. 9 shows the structure of data recorded on the magnetic tape 12. Specifically, FIG. 9A schematically shows a sole magnetic tape 12. In the present embodiment, the sole magnetic tape 12 can be used in a divided form on the partition basis. The first partition $P_0$ is arrayed next to a device area DA placed at the leading tape end. The first partition is followed by the partitions $P_1$, $P_2$, $P_3$, ..., depending on the number of the partitions produced on division. In the present system, up to a maximum of 256 partitions can be set and supervised. In FIG. 9, the suffixes n, n-1, n-2, n-3, ... of the partitions $P_n$, $P_{n-1}$, $P_{n-2}$, $P_{n-3}$, ... denote the partition numbers. In the present embodiment, data can be recorded/reproduced independently from one partition to another.

The schematic structure of a sole partition $P_m$, where m=n, n-1, n-2, n-3, ..., is comprised of a system area SYS, a data area DATA, end-of-data EOD and an optional device area ODA.

Figure 10:
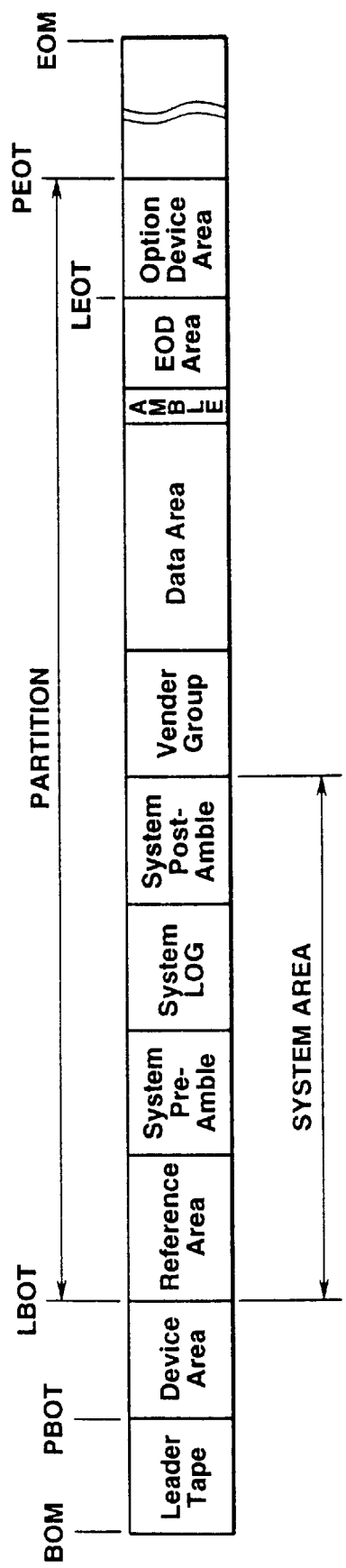
FIG. 10 shows a data structure of plural partitions formed on the magnetic tape shown in FIG. 9.

The structure of the recording data of a magnetic tape will be explained in more detail with reference to FIG. 10.

A device area (Device Area) serving for loading/unloading the tape cassette is provided between the physical leading position (physical beginning end of tape PBOT) and the leading end of the first partition $P_0$ (logical beginning of tape). Next to this device area is a system log area for storage of the tape use hysteresis information, followed by a data area. The leading end of the system log area represents the logical beginning position of the tape (logical beginning of tape or LBOT).

In the data area, a vender group, specifying the information concerning the vender formulating and furnishing data is arrayed first, followed by an amble frame and a data area in this order.

Next to the data area is an end-of-data area (EOD area) indicating the end of the data area of the partition in question. The trailing end of the EOD area is the logical end position of the tape (logical end of tape LEOT). The physical end of tape PEOT specifies the physical end position of the tape or the partition.

The optional device area is provided between the physical end of the tape LEOT and the physical end of the tape PEOT which is to be the partition end position.

In the optional device area, which is the loading/unloading position of the tape cassette provided every partition, there is recorded the position information of the position of the partition to which belongs the optional device area. The position of the current prevailing partition can be confirmed by confirming the position information. Moreover, the position of the neighboring partition also can be confirmed by this position information. For example, the position information is recorded in an ID area of each block formed in the option 1 device area.

Meanwhile, the optional device area is provided as an area for tape cassette ejection at the trailing end position of each partition excluding the last partition. An ejection area for the tape cassette 10, provided directly ahead of the leading partition, that is at the physical beginning end of the magnetic tape 12, is the above-mentioned device area.

Figure 11A:
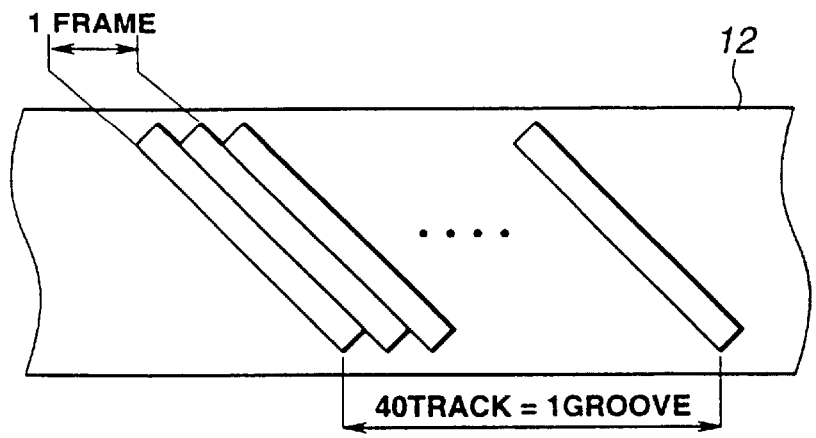
FIG. 11 shows the data structure of a track on the magnetic tape.

On the magnetic tape 12 are sequentially formed azimuth recording tracks by the rotary head 131, as shown in FIG. 11 A. The above-mentioned partition is formed by plural groups each being formed by 40 tracks or 20 frames. That is, a data recording unit in each partition represents a data recording unit, with each group being made up of 20 frames (=40 tracks), as shown in FIG. 11A.

Figure 11B:
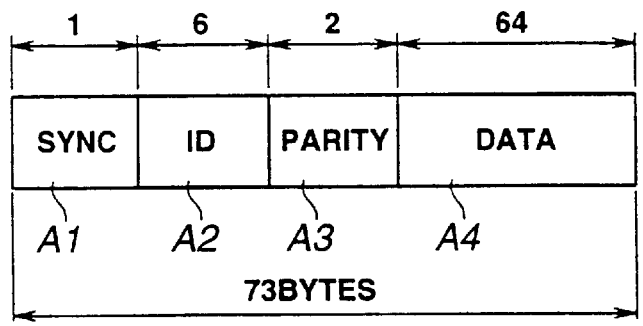
Figure 11C:
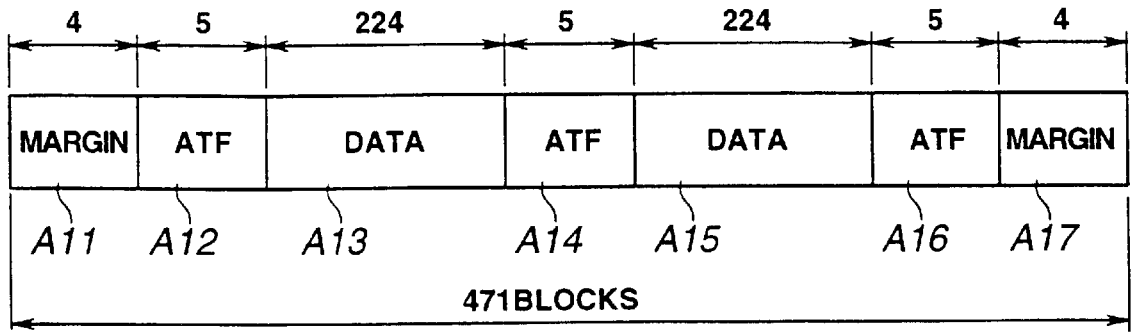

Each track is divided into blocks of a data structure shown in FIG. 11B. 471 such blocks make up a track. FIG. 11B shows the data structure in one block. Each block is made up of a one-byte SYNC data area A1, followed by a 6-byte ID area A2 for search, a two-byte parity area A3 for ID data for error correction and a 64-byte data area A4. FIG. 11C shows that one track is made up of a sum total of 471 blocks and that each track has four-block marginal areas A11, A17 on both ends, with ATF areas A12, A16 for tracking control being provided at back of the marginal area A11 and at back of the marginal area A17, respectively. An ATF area A14 is provided at a mid portion of one track. These ATF areas A12, A14 and A16 are each a five-block area. Between the ATF areas A12 and A14 and between the ATF areas A14 and A16, there ae provided data areas A13 and A15, each of 224 blocks, respectively. Thus, the total data area (A13 and A15) in one frame is 224×2=448 blocks of the totality of 471 blocks.

Also, in the present tape streamer device 1, the data area is divided into 448 blocks, with 73 bytes as one block, with each block being subdivided into a first one-byte zone for recording the synchronization signal, a second 6-byte zone for recording IDs, a third 2-byte zone for recording header parity and a fourth 64-byte zone for recording data. In each block, subcodes and the block address are recorded along with data.

Figure 12:
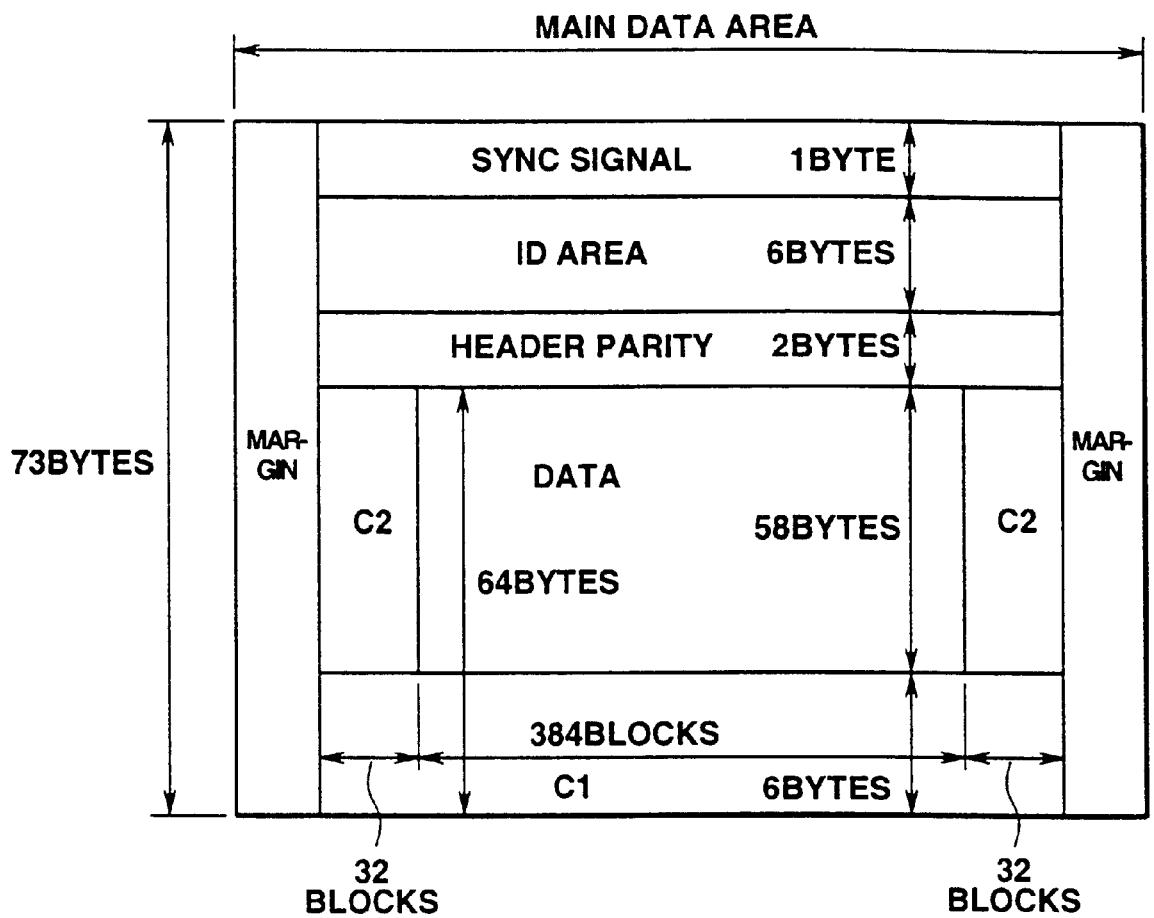
FIG. 12 shows the data structure of a track of data recorded on the magnetic tape by the tape streamer device shown in FIG. 8.

Referring to FIG. 12, data recorded in the fourth zone is constituted by 64 bytes×448 blocks of data, distributed on the block basis, with the data of the 64 bytes×448 blocks being made up of 58 bytes×384 blocks or 22272 bytes of data to which are appended two-dimensional error correction codes C2 and C1. Referring to FIG. 12, the error correction codes C1 are recorded by being appended to the block-based main data, while the error correction code C2 is split into two portions recorded in 32 blocks on both ends of the main data area of each track.

Figure 13:
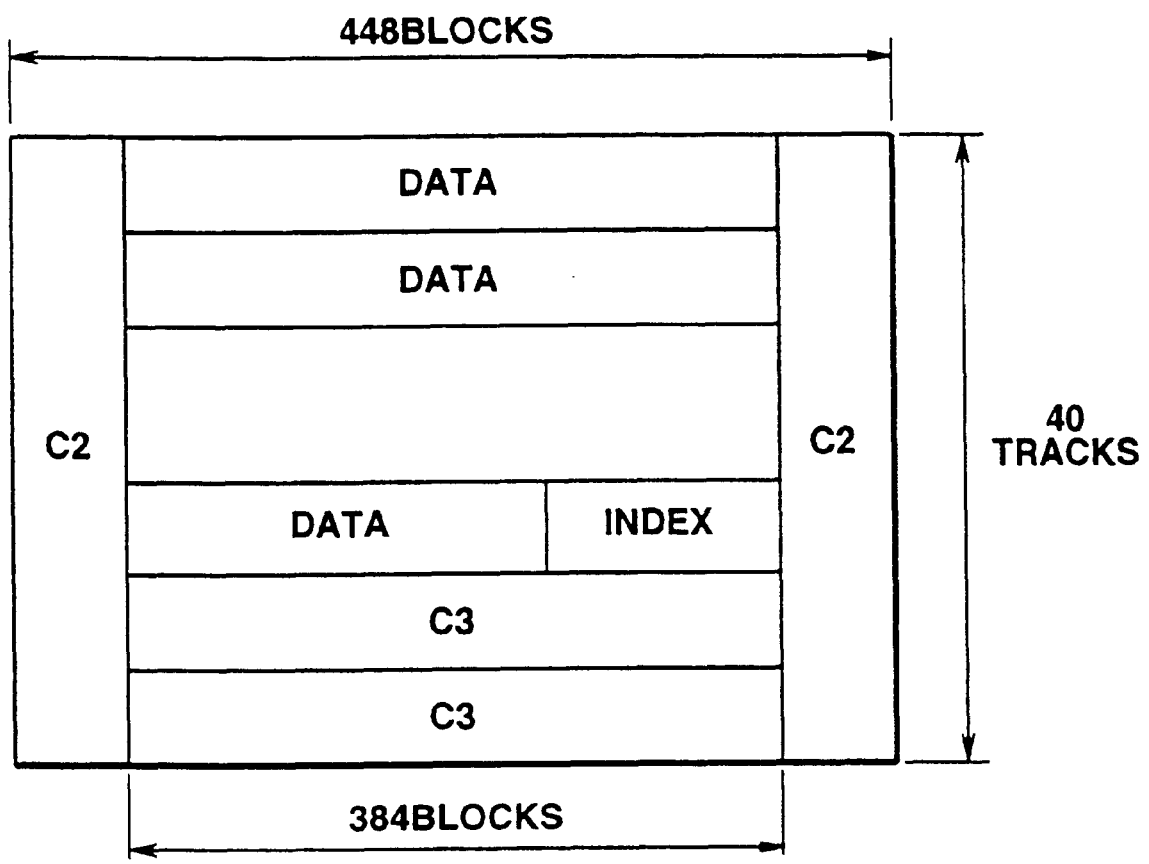
FIG. 13 shows the data structure for one unit of 40 tracks of data recorded on a magnetic tape by the tape streamer device of FIG. 8.

In the present tape streamer device 1, an error correction code structure is adopted, in which 40 tracks or 20 frames represent one unit or group for error correction, each frame being made up of two frames or 942 blocks. A correction code C2 of a data string aligned with the track direction is arrayed on each side of a track, as shown in FIG. 13, while an error correction code C3 of a data string parallel to the track width is allocated to and recorded in the last two of the 40 tracks. The index information for discriminating the series of data is appended every unit.

As the above-mentioned subcodes, there are recorded a separator count, as the demarcation information specifying the demarcation of main data, a record count, specifying the number of records, an area ID, specifying each area defined on the tape format, frame numbers specifying the absolute position of the recording unit, the group count specifying the number of recording units, and the check sum.

The ID area A2, shown in FIG. 11B, is explained with reference to FIGS. 14 and 17.

Figure 14:
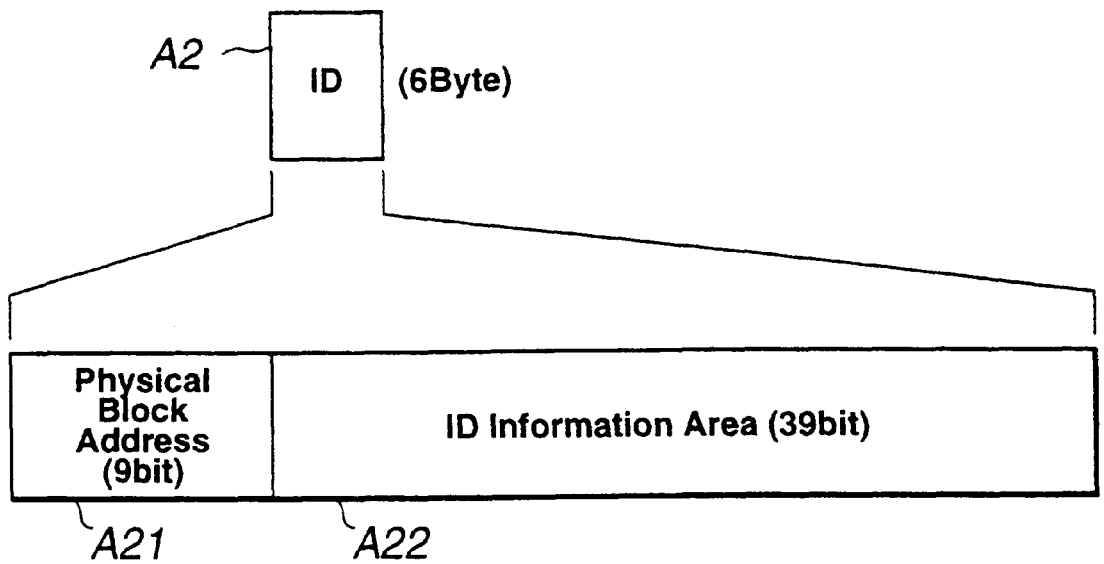
FIG. 14 shows the data structure of an ID area of the magnetic tape.

The ID area A2 has a data structure shown in FIG. 14 and is made up of a 9-bit physical block address A21 and a 39-bit ID information area A22 next following the physical block address A21.

Figure 15:
FIG. 15 shows a physical block address numbers on a track of the magnetic tape.

Since the entire data areas (A13 and A15) in one track are made up of 448 blocks, the number of the physical block addresses A21 contained in these total data areas is also 448. To these 448 physical block addresses A21 are accorded address values incrementing from 0 to 447 in decimal notation beginning from the physical block address A21 lying at the leading end of a track, as shown schematically in FIG. 15.

This renders it possible to optimally handle the information in the ID information area A22 contained in the one-track data area. This makes it possible for the recording/reproducing apparatus to optimally handle the information of the ID information area A22 contained in a 1-track data area. The data size of the ID information area A22 is 2,148 bytes, as may be found by:

39(bit)×448(blocks)=17,472(bits)=2,148bytes.

There are different types of the ID area information stored in the ID information area A22 shown in FIG. 14. The ID area information, shown in FIG. 16, is stored in the sum total of 2,184 bytes of the ID information areas A22, A22, . . . contained in the data area in one track in a distributed fashion in accordance with a preset rule. For assuring positive readout of the ID area information by the tape streamer device 1, the same ID area information is recorded a plural number of times in accordance with a pre-set rule.

In FIG. 16, the row format ID of 16 bits specify a basic format type concerning the magnetic tape 12. In the present embodiment, there are specified, for example, the track pitch, one-frame data size, the number of blocks in one track, data size in one block, tape length, tape thickness or the tape material. The logical format ID of 8 bits specifies the type of the recording format currently in use.

A logical frame ID is made up of a 1-bit last frame ID, a 1-bit ECC frame ID and a 6-bit logical frame number. The last frame ID specifies whether or not the current frame containing the ID area in question is the last frame in the group, and the ECC frame ID specifies whether or not the recording data of the data area of the current frame is the error correction code (ECC).

Each group is made up of 20 frames, as described above, with the logical frame number indicating which number frame in the current group is the frame in question.

A 16-bit partition ID specifies the partition number of the partition containing the current frame.

A 4-bit area ID specifies to which area belongs the frame in question. The 4-bit data ID specifies the type of the data processing configuration under the recording format, with 4-bit N-position and 4-bit N-repeat giving definition for the information concerning data for the multi-recording mode.

A 24-bit group count specifies the total number of groups in the current partition up to the group containing the frame in question. A 32-bit file mark count specifies the total number of file marks contained in the current partition from its beginning position to the current group. The file mark is the information specifying the demarcation of a data file in each partition.

A 32-bit save set mark count indicates the total number of file marks contained in the current partition from its beginning position up to the current group. The save set mark is the information indicating the demarcation of a data saving position in one partition.

A 32-bit record count indicates the total number of records in the current partition beginning from its current position up to the current group. A 24-bit absolute frame count indicates the total number of frames contained in the current partition from its beginning position up to the current group. An undefined reserved area is also provided for possible future addition of the ID area information.

Meanwhile, the definition of the ID area information and the numbers of bits accorded to the ID area information are merely exemplary and may be suitably modified to suit to practical using conditions.

Of the variety of ID area information items, shown in FIG. 16, an area ID, which is a critical point of the present embodiment, is hereinafter explained.

FIG. 17 shows the contents of definition of the area ID. Here, the bit numbers (3-2-1-0) are accorded to the four bits making up the area ID. The values of the bit number (3-2-1-0) of [0000], [0001], [0010] and [0011], as shown in FIG. 17, indicate a device area, a reference area, a system log area and reserved, respectively. [0100], [0101], [0110] and [0111] denote a data area, an EOD area, reserved and an optional device area other than the indispensable device areas shown in FIG. 10. The optional device area, used for loading/unloading the magnetic tape 12, will be explained subsequently.

In each column indicating the values of bits of the bit number (3-2-1-0) in FIG. 17, the numbers shown in parentheses indicate the bit values in decimal notation.

Figure 18:
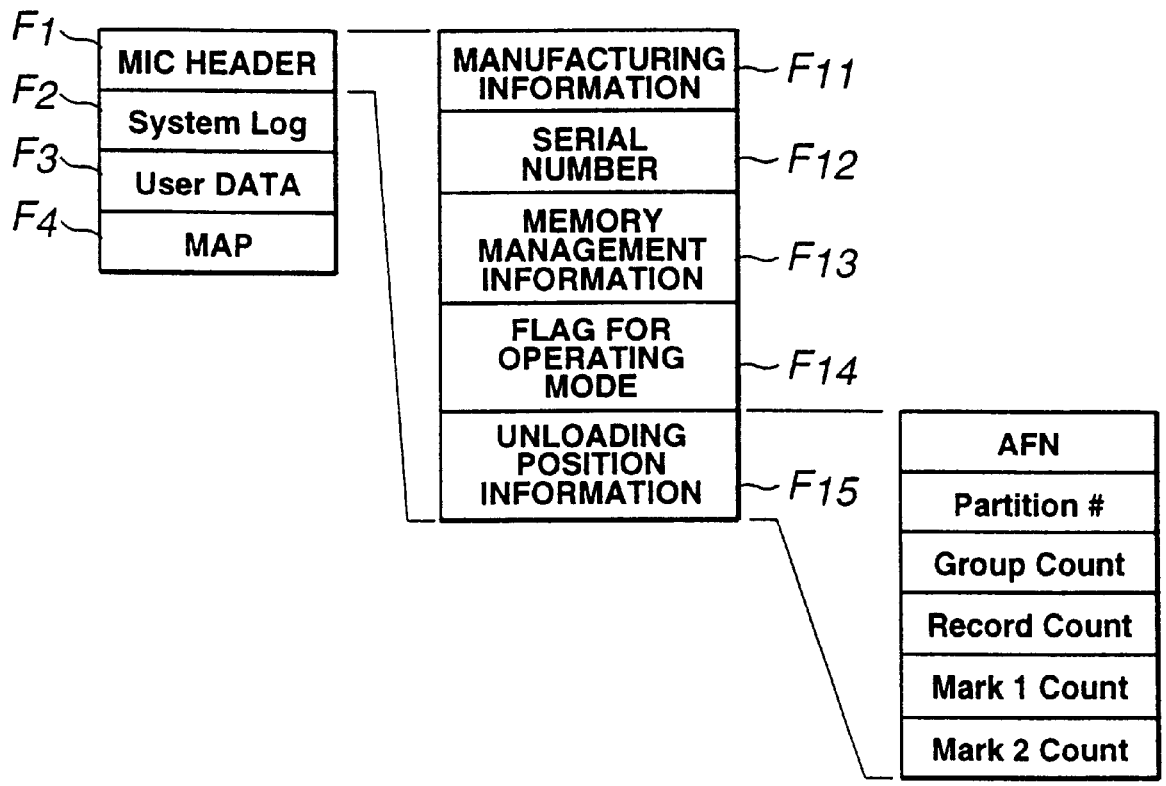
FIG. 18 shows the structure of data stored in a MIC loaded on the tape cassette.

FIG. 18 shows a data structure of the MIC 11 having the capacity of, for example, 2 megabyte. In this area of the MIC, there are set fields F1 to F4.

The field F1 is a MIC header in which there are written the tape information on initialization and the partition-based information. Specifically, the MIC header is made up of the manufacture information F11 on various items at the time of manufacture, serial numbers F12, memory management information F13, flags for operating modes F14 and the unload position information F15, etc.

The unload position information F15 is mainly made up of the position information of the magnetic tape 12 on unloading from the tape streamer device 1. For example, the unload position information F15 is made up of an absolute frame number AFN, partition numbers, group count, record count, mark 1 count, mark 2 count etc.

The field F2 is formulated in association with each partition actually recorded on the magnetic tape 12. In this field F2, each system log is stored, and a system log is recorded every partition. In the system log area on the magnetic tape 12, there can be written the information of the contents similar to those of the system log area in the MIC 11.

The field F3 is for user data such that the information furnished by the user (vender etc) concerning the tape cassette 10 itself is stored therein and, if need be, sent to the external host computer 200 so as to be used for processing control.

The field F4 is a map area in which the absolute position information of various data is stored.

With the present tape streamer device 1, the partition arraying information can be stored as the partition information in the MIC 11 of the tape cassette 10 having the magnetic tape 12 carrying the data area as described above. For example, the partition number can be stored in the MIC 11 simultaneously with initialization of the magnetic tape 12.

Figure 19:
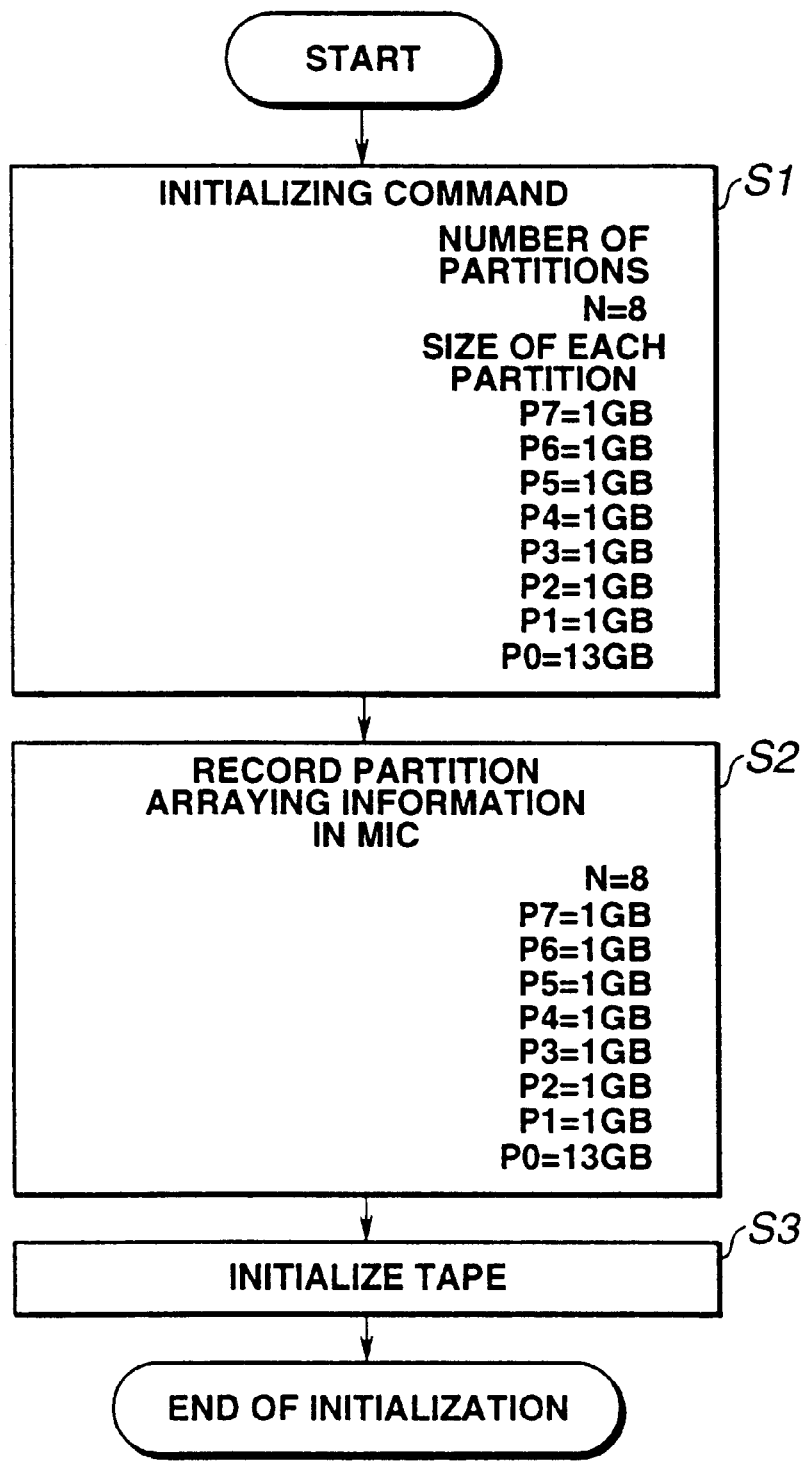
FIG. 19 is a flowchart showing the sequence of initialization of a magnetic tape by the tape streamer device shown in FIG. 8.

FIG. 19 shows a flowchart illustrating the sequence of operations for storing the partition numbers in the MIC 11 simultaneously with initialization of the magnetic tape 12.

At step S1, the system controller 161 receives from the host computer 200 an initialization command in which there are stated a predetermined total number of the partitions formed on the magnetic tape 12 and a predetermined magnitude of each partition.

At step S2, the system controller 161 controls the write/readout controller 163 to record the total number of the partitions formed on the magnetic tape 12, the number of each partition or the size of each partition etc in e.g., the field F3 of the MIC 11 responsive to the above-mentioned initializing command.

Then, at step S3, the system controller 16 initializes the magnetic tape 12.

By the above sequence of operations, the magnetic tape 12 is initialized to produce partitions in the magnetic tape 12.

By this initialization, there are formed partitions having the partition numbers in the falling order fem the beginning to the end of the tape, as shown in FIG. 1.

In the flowchart of FIG. 19, the magnetic tape 12 is initialized after the processing of storing the information on the partitions on the MIC 11. Alternatively, the partition arraying information can be stored in the MIC 11 simultaneously with or after initialization of the magnetic tape 12.

Thus, the tape streamer device 1 can perpetually grasp the number or the size of the partitions formed on the magnetic tape 12, or the total number of the partitions, so that the tape streamer device 1 can immediately comprehend the arraying of the partitions on the entire tape irrespective of the current position on the tape.

For example, if a new partition is added or a pre-existing partition is deleted, the arraying of the partitions on the entire tape can be known irrespective of the current tape position, so that movement to a desired partition can be realized immediately.

Figure 20:
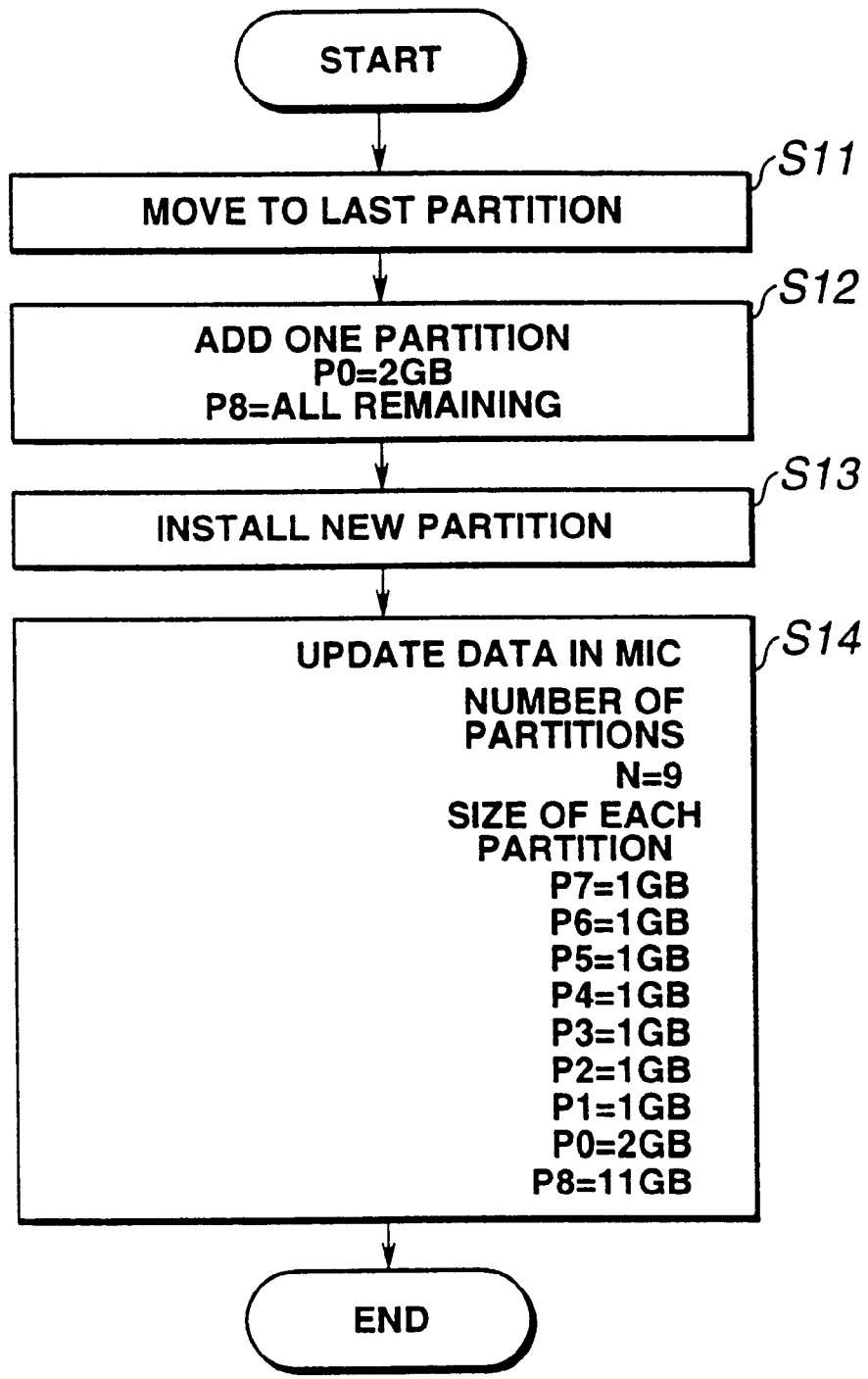
FIG. 20 is a flowchart showing the sequence of addition of partitions by the tape streamer device.

The addition or deletion of the partitions is now explained. First, the partitions are added in accordance with the flowchart shown in FIG. 20.

The system controller 161 first controls the motor driving servo circuit 150 to cause movement of the tape streamer device 1 to the last partition, herein the partition $P_0$, as shown at step S11. On reception of a command from the host computer 200 for newly adding a partition, the system controller 161 adds the partition. This new partition is added by e.g., splitting the partition $P_0$. This splitting is performed on the basis of the size of the partition $P_0$ to be divided and the information on the newly added partition $P_8$.

Figure 2:
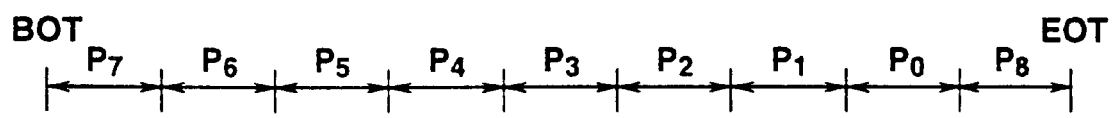
FIG. 2 shows a magnetic tape having partition numbers affixed thereon in the falling order from the BOT to the EOT of the tape, particularly showing the state in which a trailing end side partition is split to form a new partition $P_8$.

The system controller 161 instals the new partition $P_8$ at the next step S13. This puts the partition $P_8$ in the partition array, as shown in FIG. 2.

The new partition may also be formed after elongating the data area of a pre-existing partition before installing the new partition.

Afer step S13, the system controller 161 updates the partition arraying information, as shown at step S14. Specifically, the total number N is set to 9 (N=9) and the fact of addition of the partition P8 is stored in e.g., the field F3 of the MIC 11.

Thus, the system controller 161 adds a new partition to the magnetic tape 12 to update the partition arraying information stored in, for example, the field F3 in the MIC 11.

Thus, if a new partition is added, the tape streamer device 1 can confirm the valid partition number and whereabouts of the desired partition, based on the partition arraying information recorded in, for example, the correspondingly updated field F3 in the MIC 11, irrespective of the current position of the tape streamer device 1. Since it is unnecessary to check the entire tape area, the tape streamer device 1 can be instantly moved to a desired partition. If desired to split the pre-existing partition to add a new partition, the corresponding operation can be executed promptly.

Figure 21:
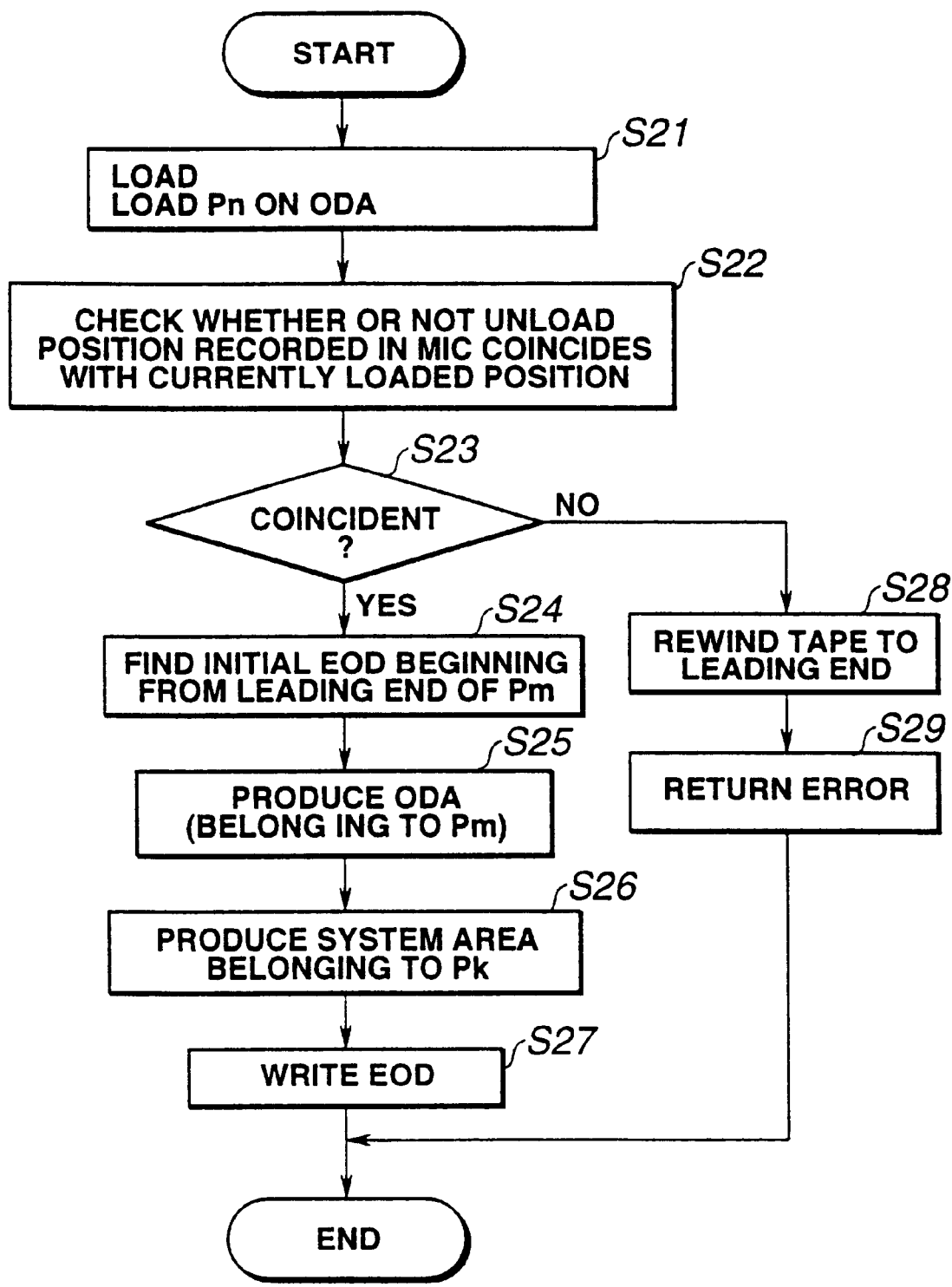
FIG. 21, similarly to FIG. 20, is a flowchart showing the sequence of addition of partitions by the tape streamer device.

The specified operation of adding partitions is executed in accordance with the flowchart shown in FIG. 21. In the present embodiment, a partition $P_m$ is split to add a new partition $P_k$.

First, the system controller 161 controls the motor driving servo circuit 150 at step S21 to start the loading of the tape cassette 10. This loading is done as the head is intruded into the optional device area ODA of the partition having the partition number $P_m$, as shown in FIG. 2A. At step S22, the system controller 161 verifies whether or not the previous unloading position recorded in the field F15 of the MIC 11 is equal to the current loading position. This verification is made by the ID specifying the partition number read out from the optional device area ODA.

If the previous unloading position is equal to the current loading position, the system controller 161 proceeds from step S23 to step S24 and, if otherwise, the system controller 161 proceeds from step S23 to step S28.

At this step S28, the magnetic tape 12 is rewound to its leading end position. At step S29, an error signal is issued to terminate the processing.

Figure 22:
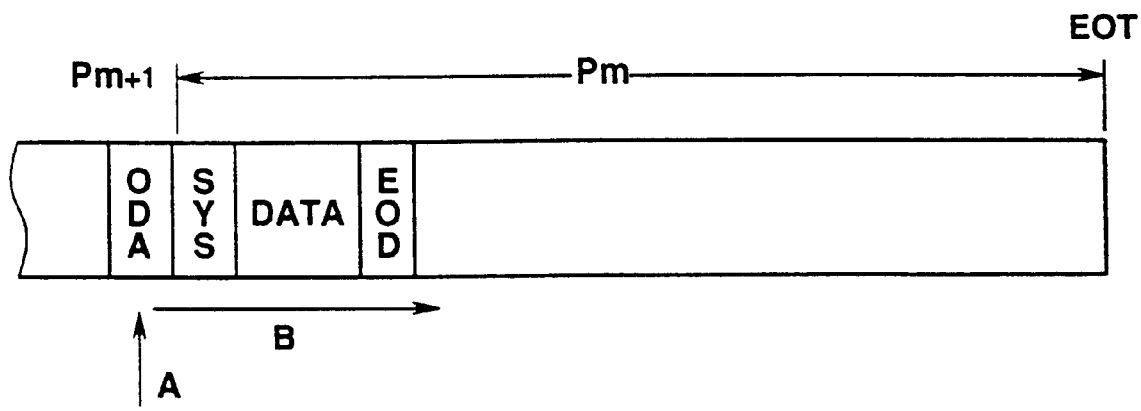
FIG. 22 illustrates the operation performed on the magnetic tape in case of partition addition by the tape streamer device.

At step S24, the system controller 161 reads the recorded signal from the leading position in the partition $P_m$ to find the first end-of-data EOD. The operation of reading the signals recorded on the partition $P_m$ is the operation indicated by arrow B in FIG. 22.

If the EOD is found, the system controller 161 proceeds to step S25 where the tape streamer device 1 writes the optional device area ODA belonging to the partition Pm. The tape streamer device 1 proceeds to step S26 to write the system area SYS belonging to the new partition Pk. The system controller 161 then proceeds to step S27 to write the end-of-data EOD belonging to the new partition $P_8$. After the new partition $P_k$ is formed in this manner, the tape streamer device 1 terminates the processing.

Figure 23:
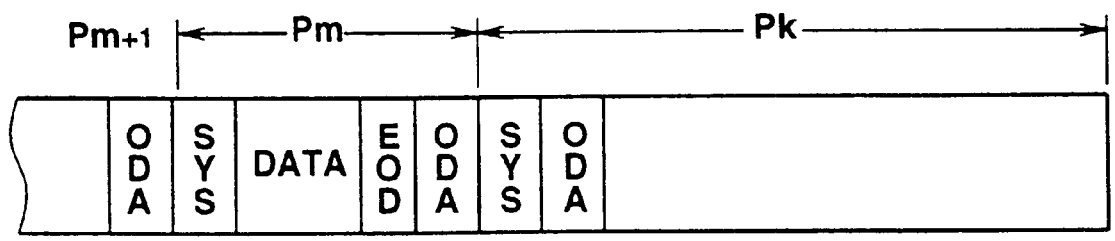
FIG. 23 shows a new partition formed on the magnetic tape by the tape streamer device.

The new partition Pk, shown in FIG. 23, is formed by writing the optional device area ODA belonging tore the partition Pm at step S25, writing the system area SYS belonging to the new partition Pk at step S26 and by writing the end-of-data EOD belonging to the new partition Pk at step S27.

The operation of adding the partition as described above or the operation of deleting the partition as later explained can be executed from the host computer 200 using the SCSI command.

Figure 24:
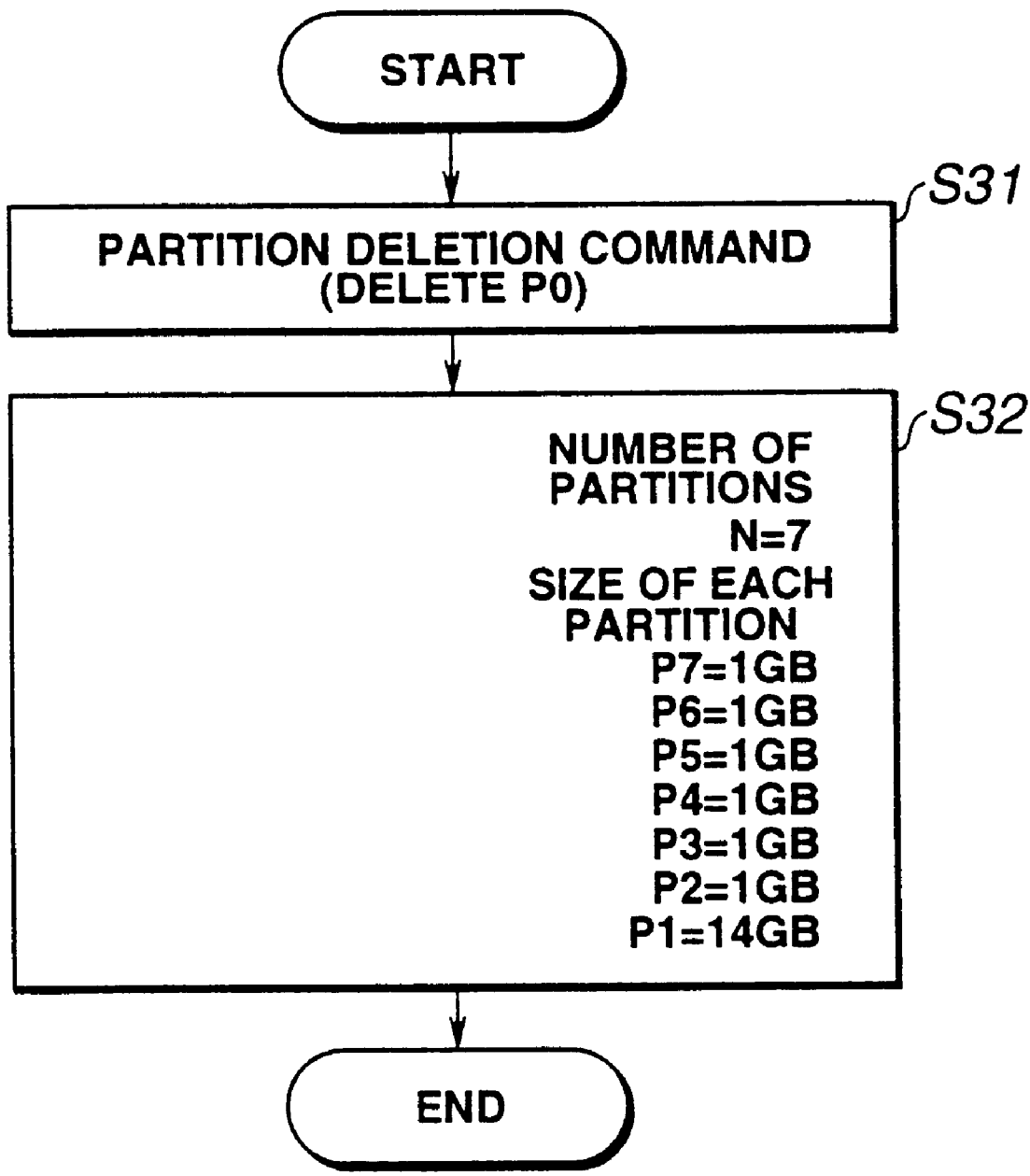
FIG. 24 is a flowchart showing the sequence of operations for partition deletion by the tape streamer device.

The partition deletion is now explained. The partition deletion is executed in accordance with the flowchart shown in FIG. 24.

Figure 3:
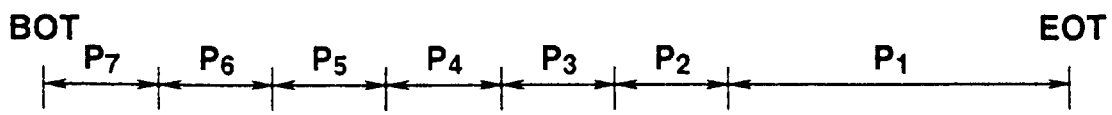
FIG. 3 shows a magnetic tape having partition numbers affixed thereon in the falling order from the BOT to the EOT of the tape, particularly showing the state in which a trailing end side partition $P_0$ has been deleted.

On reception of a command for deleting the partition from the host computer 200, the system controller 161 deletes a partition, herein a partition $P_0$. This deletes the partition $P_0$ shown in FIG. 1 so that the partition at the trailing end of the tape is an area of the partition $P_1$, as shown in FIG. 3.

The system controller 161 updates the partition arraying information, as shown at step S32. That is, the total number of the partitions n is set to 7 (N=7) and the fact of deletion of the partition $P_0$ is stored in the field F3 of the MIC 11 via the write/readout controller 163.

The system controller 161 thus deletes the partition on the magnetic tape 12 to update the partition arraying information stored in the field F3 of the MIC 11.

Thus, the tape streamer device 1 can promptly confirm the effective partition number and the whereabouts of the partitions, even if the partition has been deleted, based on the partition arraying information recorded in the correspondingly updated MIC 11, irrespective of the prevailing position of the tape streamer device 1, such that the tape streamer device can comprehend the fact of deletion of the partition without accessing the site where the deleted partition was located.

Figure 25:
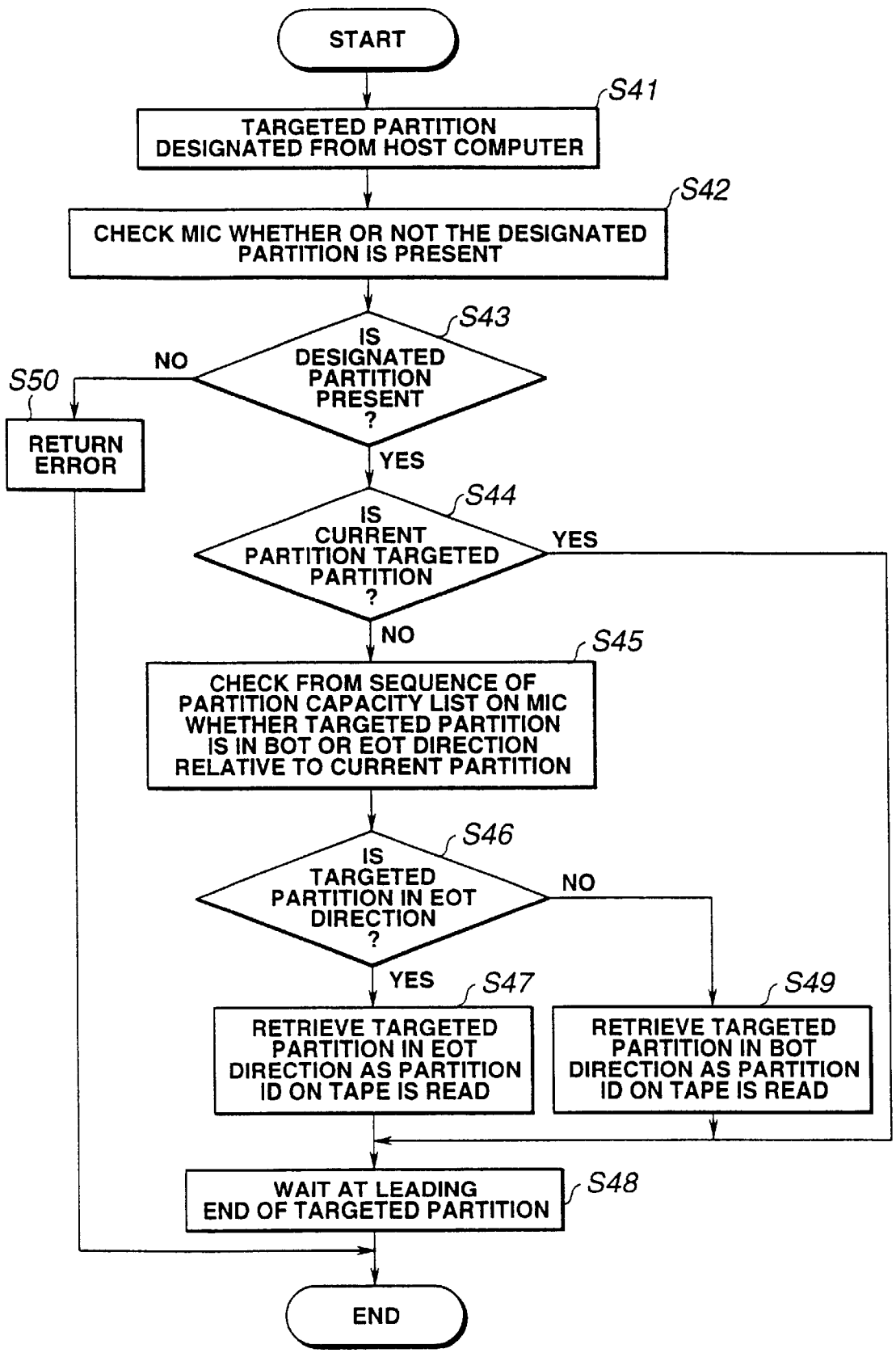
FIG. 25 is a flowchart showing the sequence of processing operations in case of movement from the current position to the target partition.
Figure 26:
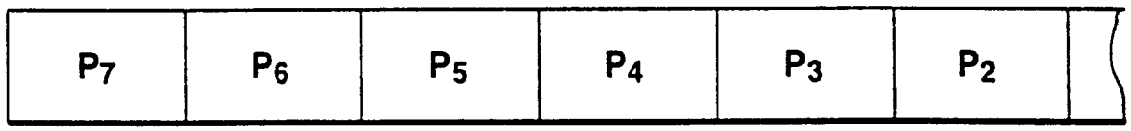
FIG. 26 shows the state of actual partition formation on the magnetic tape.
Figure 27:
FIG. 27 illustrates the state as if the partitions downstream of P4 towards the trailing end of the tape has been deleted, which state is brought about by acting on the partition arraying information.

The processing of the tape streamer device being shifted from the current partition to the target partition is specifically explained using the flowchart shown in FIG. 25.

First, at step S41, the system controller 161 receives a command as to the partition of destination from the host computer 200.

The system controller 161 then checks whether or not the designated partition exists, as shown at step S42. At step S43, it is verified whether or not the designated target partition exists.

If the result of the above check is affirmative, that is if it is found that the designated target partition exists, based on the partition arraying information stored in the MIC 11, the system controller 161 proceeds to step S44. If the result of the above check is negative, that is if it is found that the designated target partition does not exist, based on the partition arraying information stored in the MIC 11, the system controller 161 proceeds to step S50.

At S50, since there is no designated partition, the result is returned as an error to the host computer 200.

At step S44 where the designated target partition is confirmed to exist, it is checked whether or not the current partition is the target partition.

If the result of check at step S44 is affirmative, that is if the current partition is found to be the targeted partition, the system controller 161 enters the standby state at step S48 at the leading position of the current partition, that is the target partition, to terminate the retrieval of the target partition in question.

If the result of check at step S44 is negative, that is if the current partition is found not to be the targeted partition, the system controller 161 proceeds to step S45.

At step S45, the system controller 161 verifies, from the partition arraying information in the magnetic tape 12, whether the target partition is in the BOT direction or in the EOT direction, from the partition arraying information (capacity list). At the next step S46, the system controller 161 verifies whether or not the target partition is in the above-mentioned EOT direction.

If the result of check at step S46 is affirmative, that is if the target partition is in the above-mentioned EOT direction, the system controller 161 proceeds to step S47 to retrieve the target partition in the EOT direction as it reads the partition ID on the tape. If the target partition is reached, the system controller 161 enters the standby state at step S48 at the leading end position of the target partition to terminate the retrieval processing for the target partition.

If the result of check at step S46 is negative, that is if the target partition is not in the above-mentioned EOT direction, the system controller 161 proceeds to step S49 to retrieve the target partition in the BOT direction as it reads the partition ID on the tape. If the target partition is reached, the system controller 161 enters the standby state at step S48 at the leading end position of the target partition to terminate the retrieval processing for the target partition.

The tape streamer device 1 can confirm the presence of the target partition in this manner based n the partition arraying information stored in the MIC 11 to move to the target partition.

If there is no target partition on the magnetic tape 12, such as due to deletion, the tape streamer device 1 can comprehend the fact that the target partition has been deleted, without accessing the target partition.

If the partitions are arrayed irregularly on the magnetic tape 12, the tape streamer device 1 can promptly move the target partition promptly and reliably.

In the tape streamer device 1, the partitions can also be erased by acting on the partition arraying information stored in the MIC 1. For example, the partitions provided on the magnetic tape 12 can be erased by void data etc on the addresses without actually deleting the partition. For example, if the partitions $P_7$, $P_6$, $P_5$, $P_4$, $P_3$, $P_2$, ... are formed on the magnetic tape 12, the partitions downstream of the partition P4 can, as it were, be erased towards the trailing end of the tape by acting only on the partition arraying information.

Since this can erase the nominal existence of the partition provided on the magnetic tape 12, without actually erasing the partition as an entity, high-speed partition deletion becomes possible.

If the partition is erased in this manner on the MIC 11, a flag can be set at the deleted site for specifying that the partition thereat has been deleted.

Since the partition arraying information stored in the MIC 11 is acted on and actually the data etc in the partition is not deleted, the flag can be reset for restoring the allegedly deleted partition provided that such restoration is attempted directly after the partition arraying information is acted on to set up the partition erasing state.

Since the nominal existence of the partition can be erased by acting on the partition arraying information stored in the MIC 11, partitions can be deleted even if the tape cassette 10 is loaded on the tape streamer device 1 and actually the tape is not loaded in position, or the tape cassette 10 is present outside the tape streamer device 1.

Although the partition is deleted in the above description by acting on the partition arraying information stored in the MIC 11, the present invention may also be applied to a case of changing the arraying position of the partitions.

Although the partition numbers of the partitions formed on the magnetic tape 12 are in the falling order from the beginning end of the magnetic tape, any suitable partition arraying order other than the falling order may be used. For example, the partition arraying order may be an increasing order from the beginning end of the magnetic tape.

What is claimed is:

1. A tape recording and/or reproducing apparatus for recording data on a tape-shaped recording medium of a tape cassette, said tape cassette having a tape-shaped recording medium divided in partitions in which data is recorded and having storage means for storing information concerning the tape-shaped recording medium, wherein the storage means is independent of the tape-shaped recording medium, the apparatus comprising:

partition rewriting means for rewriting the partitions on said tape-shaped recording medium and allowing addition and deletion of partitions;

writing means for storing arraying information in said storage means specifying a present arraying of all of said partitions rewritten on said tape-shaped recording medium;

recording and/or reproducing means for recording and/or reproducing the recording data to/from said partitions; and controlling means for controlling said recording and/or reproducing means based on said arraying information to record and/or reproduce data, wherein said arraying information includes numbers associated with respective partitions and said numbers are associated with said partitions at a time of initialization of said tape-shaped recording medium so as to be in descending order from a leading end to a trailing end of the tape-shaped recording medium, and wherein said controlling means receives instructions from outside as to a target partition, and said controlling means verifies, responsive to said instructions, whether there is a targeted partition in said tape-shaped recording medium, and when controlling means confirms, responsive to said instructions, that the targeted partition exists on said tape-shaped recording medium, said controlling means verifies, based on said arraying information, whether the targeted information exists ahead of or behind a current partition.

2. The tape recording and/or reproducing apparatus according to claim 1 wherein said arraying information includes information specifying a respective size of each partition.

* * * * *